US009939227B2

(12) United States Patent
Maggiore

(10) Patent No.: US 9,939,227 B2
(45) Date of Patent: Apr. 10, 2018

(54) BUG KILLING GUN

(71) Applicant: Loren Maggiore, Santa Monica, CA (US)

(72) Inventor: Loren Maggiore, Santa Monica, CA (US)

(*) Notice: Subject to any disclaimer, the term of this patent is extended or adjusted under 35 U.S.C. 154(b) by 0 days.

(21) Appl. No.: 15/801,393

(22) Filed: Nov. 2, 2017

(65) Prior Publication Data

US 2018/0064092 A1 Mar. 8, 2018

Related U.S. Application Data

(63) Continuation of application No. PCT/US2016/039268, filed on Jun. 24, 2016.

(51) Int. Cl.
*F41B 11/52* (2013.01)
*A01M 27/00* (2006.01)
(Continued)

(52) U.S. Cl.
CPC .............. *F41B 11/52* (2013.01); *A01M 27/00* (2013.01); *F41B 11/62* (2013.01); *F41B 11/68* (2013.01); *F41G 1/35* (2013.01); *F41G 3/08* (2013.01)

(58) Field of Classification Search
CPC ........... F41B 11/50; F41B 11/51; F41B 11/52; F41B 11/53; F41B 11/642; F41B 11/64; F41B 11/641; F41B 11/646; F41B 11/647; F41B 11/68; F41B 11/681; F41B 11/683; F41B 11/80; F41B 11/81; F41B 7/08; F41B 7/00; F41B 7/02; F41B 7/006;
(Continued)

(56) References Cited

U.S. PATENT DOCUMENTS 507,470 A * 10/1893 Bailey ................... F41B 11/647
124/49
1,205,586 A * 11/1916 Worley ................. F41B 11/647
124/51.1
(Continued)

OTHER PUBLICATIONS

International Search Report and Written Opinion dated Mar. 24, 2017 for PCT Application No. PCT/US2016/039268.

*Primary Examiner* — Derrick R Morgan
(74) *Attorney, Agent, or Firm* — David A. Belasco; Belasco Jacobs & Townsley, LLP

(57) ABSTRACT

An improved bug killing gun includes a compressed gas source fluidly connected to a chamber connected to a barrel. A compressed gas release mechanism is connected to the compressed gas source. A projectile storage magazine stores particulate projectiles and is located adjacent the chamber. A projectile loading mechanism moves the projectiles into the chamber from the magazine. A cocking mechanism is mechanically connected to the compressed gas source, the compressed gas release mechanism, and the projectile loading mechanism. When the gun is cocked, the projectile loading mechanism loads a quantity of the particulate projectiles into the chamber. When the compressed gas release mechanism is activated the projectiles are ejected from the chamber into the barrel and expelled from the gun. The gun optionally includes a laser sighting mechanism. The battery operated laser sighting mechanism may be removably attached to the barrel or permanently attached with an integral, trigger operated switch.

15 Claims, 20 Drawing Sheets

(51) Int. Cl.
  *F41G 1/35* (2006.01)
  *F41B 11/62* (2013.01)
  *F41G 3/08* (2006.01)
  *F41B 11/68* (2013.01)

(58) Field of Classification Search
  CPC .... F41B 7/003; F41B 7/04; F41B 7/10; F41A 9/15; F41A 9/14; F41A 9/13; F41A 9/12; F41A 9/11; F41A 9/06
  See application file for complete search history.

(56) References Cited

U.S. PATENT DOCUMENTS

| | | | |
|---|---|---|---|
| 1,266,533 A * | 5/1918 | Beck | F41B 11/647 |
| | | | 124/65 |
| 1,611,533 A | 12/1926 | Kirsten | |
| 1,869,600 A * | 8/1932 | Loomis | F41A 17/58 |
| | | | 124/37 |
| 3,308,571 A | 3/1967 | Jones | |
| 3,403,669 A * | 10/1968 | Crosman | A63H 5/04 |
| | | | 124/29 |
| 3,672,301 A | 6/1972 | Abbott | |
| 3,704,981 A | 12/1972 | Pohr | |
| 3,791,303 A | 2/1974 | Sweeney et al. | |
| 4,161,076 A | 7/1979 | Snyder | |
| 4,653,433 A | 3/1987 | Comparetti | |
| 4,834,059 A * | 5/1989 | Moorhouse | F41B 11/50 |
| | | | 124/31 |
| 6,220,237 B1 | 4/2001 | Johnson | |
| 6,257,115 B1 * | 7/2001 | Balsavage | F41A 9/12 |
| | | | 42/39.5 |
| 6,393,992 B1 | 5/2002 | Vasel et al. | |
| 6,772,694 B1 | 8/2004 | Pearce, III et al. | |
| 7,207,497 B2 | 4/2007 | Clark | |
| 7,287,527 B1 | 10/2007 | Piper | |
| 8,251,051 B2 * | 8/2012 | Maggiore | A01M 3/00 |
| | | | 124/40 |
| 2002/0179075 A1 | 12/2002 | Robinson, Jr. et al. | |
| 2006/0283433 A1 | 12/2006 | Gerardo | |
| 2009/0255434 A1 | 10/2009 | Pawloski | |
| 2010/0326414 A1 * | 12/2010 | Maeda | F41B 11/51 |
| | | | 124/74 |
| 2012/0216786 A1 * | 8/2012 | Hadley | F41B 11/51 |
| | | | 124/66 |
| 2015/0059722 A1 * | 3/2015 | Yang | F41B 11/646 |
| | | | 124/27 |

* cited by examiner

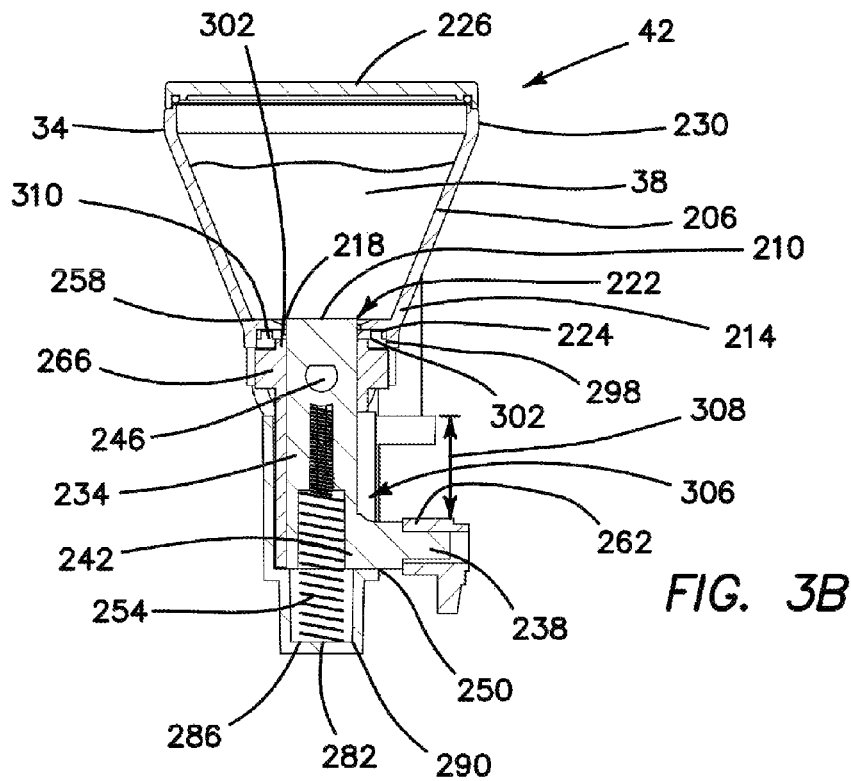
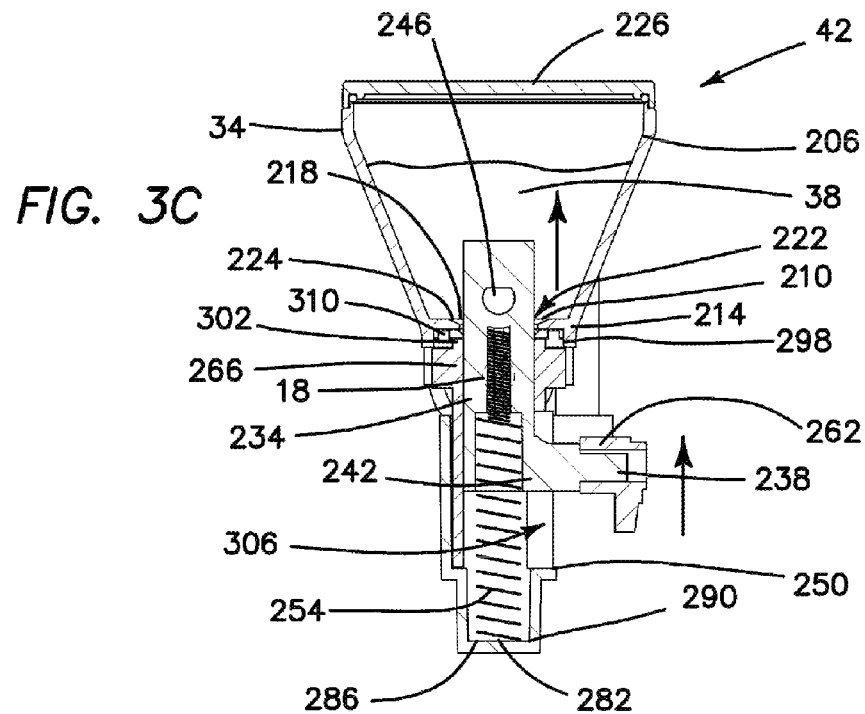

BUG KILLING GUN

PRIOR APPLICATION

The present application is a continuation of International Application No. PCT/US2016/039268, filed Jul. 29, 2016 and incorporates the disclosure of which in its entirety.

FIELD OF INVENTION

This invention relates to the fields of weaponry and insect control, and more specifically to a device for killing insects at a distance without use of toxic chemicals.

BACKGROUND OF THE INVENTION

Many methods and devices have been developed for dealing with insect pests. Many people are particularly interested in dealing with flying insects as they tend to be very visible, sometimes noisy and often possessing the capability to bite or sting. Traditional means for killing flying insects include devices such as fly swatters and their equivalent or chemical sprays. The former requires a certain skill and agility to be effective and the latter leaves a potentially harmful chemical residue in the area where used. The present invention addresses these concerns and also provides entertainment to those tasked with removal of insect pests in the form of a gun designed for shooting flying insects. Other devices developed to provide insect removal in a related fashion include the following inventions.

U.S. Pat. No. 1,611,533, issued to Kirsten, is directed to an insect shooting apparatus wherein a spring-loaded pistol-type device is used to dispense a shot or bead of material in order to exterminate various household insects such as flies. The device takes the form of a gun or pistol with a piston that is operated through a linkage mechanism and released under spring actuation by means of trigger. The movement of piston in a forward direction ultimately causes release of a shot holding a nozzle from a tapered end of the barrel. A shot holding nozzle contains a liquid which when dispersed upon an insect such as a fly and exterminates same.

U.S. Pat. No. 4,653,433, issued to Comparetti is directed to a flea zapper which takes the form of a pistol and when activated by a triggered mechanism releases a powder material for controlling insects such as fleas normally found on furry animals. The flea zapper takes the form of a handgun with a pistol-type handle with a trigger to be operated by the finger of the user. When the trigger is operated, a sample of powder is released from the powder chamber through the barrel portion through an opening and dispensed onto the animal.

U.S. Pat. No. 3,791,303, issued to Sweeny et al. is directed to deterrent ammunition which takes the form of a liquid-filled hollow ball. The projectile assembly is fired from an oversized tubular barrel extension on the end of a shotgun. The projectile assembly contains deterrent ammunition which upon rupture may control flies or other insects.

U.S. Patent Application No. 2006/0283433, published for Gerardo is directed to a projection apparatus using pressurized air. The device comprises a gun-like device, an air chamber with a trigger with a valve inside of connector that connects the air chamber to the barrel. The air chamber can be filled with compressed air and after loading the gun with an object to be fired from barrel the operator then opens the valve to allow the air pressure out of chamber releasing the air from the chamber under operation of trigger and the projectile is released from the barrel.

U.S. Pat. No. 7,207,497, issued to Clark is directed to a dry flake sprayer and method which is used to spray dry flakes utilizing a pressurized gas source. The flake spraying device includes a spray module and a gun module wherein the spray module comprises an enclosure with a gas flow conduit and a flake conduit. A supply of dry flakes is placed into the enclosure and connected to gun and when the trigger is operated. Gas flows from the control valve through nozzle which causes the flakes to be dispersed through conduit.

U.S. Pat. No. 8,251,051, issued to Maggiore, the Applicant, is directed to a bug killing gun that includes a compressed gas source fluidly connected to a chamber connected to a barrel. A compressed gas release mechanism is connected to the compressed gas source. A projectile storage magazine stores particulate projectiles and is located adjacent the chamber. A projectile loading mechanism moves the projectiles into the chamber from the magazine. A cocking mechanism is mechanically connected to the compressed gas source, the compressed gas release mechanism, and the projectile loading mechanism. A stock houses and supports the compressed gas source, the compressed gas release mechanism, the barrel, the chamber, the projectile storage magazine, the cocking mechanism and the projectile loading mechanism. When the gun is cocked, the projectile loading mechanism loads a predetermined quantity of the particulate projectiles into the chamber. When the compressed gas release mechanism is activated the projectiles are ejected from the chamber into the barrel and expelled from the gun.

It is an objective of the present invention to provide a device for killing flying insects. It is a further objective to provide such a device that uses non-toxic means for killing the insects. It is a still further objective of the invention to provide an insect killing device that incorporates positive safety features. It is yet a further objective to provide such a device that is entertaining to use and inexpensive to operate. Finally, it is an objective of the present invention to provide an insect killing device that is durable, inexpensive and simple for the user to master.

While some of the objectives of the present invention are disclosed in the prior art, none of the inventions found include all of the requirements identified.

SUMMARY OF THE INVENTION

The present invention addresses all of the deficiencies of prior art bug killing gun inventions and satisfies all of the objectives described above.

(1) An improved bug killing gun providing the desired features may be constructed from the following components. A compressed gas source is provided. A chamber is provided. The chamber is fluidly connected to the compressed gas source. A barrel is provided. The barrel is located at a distal end of the chamber. A compressed gas release mechanism is provided. The release mechanism is connected to the compressed gas source. A projectile storage magazine is provided. The magazine stores particulate projectiles and is located adjacent the chamber. A projectile loading mechanism is provided. The loading mechanism moves the particulate projectiles into the chamber from the magazine. A cocking mechanism is mechanically connected to the compressed gas source, the compressed gas release mechanism, and the projectile loading mechanism. A primary automatic safety mechanism is provided. The primary safety mechanism moves to an activated position upon utilization of the cocking mechanism and moves to a deactivated position when manually deactivated by a user. The status of the primary safety mechanism is displayed by movement of a primary external safety lever from a first, safe position to a second, firing position. A stock is provided. The stock houses and supports the compressed gas source, the compressed gas release mechanism, the barrel, the chamber, the projectile storage magazine, the cocking mechanism and the projectile loading mechanism. When the gun is cocked by the cocking mechanism, the projectile loading mechanism gathers a predetermined quantity of the particulate projectiles and positions the projectiles in the chamber. When the compressed gas release mechanism is activated the projectiles are ejected from the chamber into the barrel and expelled from the gun.

(2) In a variant of the invention, a secondary safety indicator is provided. The secondary safety indicator is moved from a hidden position to a visible position by the gun cocking action and is moved to the hidden position by activation of the compressed gas release mechanism.

(3) In another variant, the compressed gas source is selected from the group that includes a prefilled $CO_2$ cartridge, a refillable compressed gas cylinder, a pneumatically pumped gas reservoir, a spring-activated compressed gas chamber and an external compressed gas line.

(4) In still another variant, the spring-activated compressed gas chamber further includes a cylinder. The cylinder has a front end and a rear end and is fluidly connected to the chamber at the front end. A piston is provided. The piston fits sealably in the cylinder and is located within it. A compression spring is provided. The compression spring urges the piston toward the front end. A spring compression mechanism is provided. The compression mechanism urges the piston towards the rear end and compresses the compression spring. A latching mechanism is provided. The latching mechanism releasably retains the piston adjacent the rear end and retains the compression spring in a compressed state. A user performs the gun cocking action, the spring compression mechanism is operated, the piston is urged toward the rear end of the cylinder, the spring is compressed and the spring and the piston are retained by the latching mechanism until released, allowing the piston to move rapidly toward the front end of the cylinder. This provides a burst of compressed gas in the cylinder and to the connected chamber.

(5) In yet another variant, the compressed gas release mechanism further includes a trigger. The trigger is urged forward by a trigger return spring. The trigger has an upper protrusion. The upper protrusion engages an internal safety pivot. The safety pivot prevents release of the latching mechanism unless the cocking action is completed. The trigger has an elevating ramp located rewardly of the upper protrusion. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a main pole of the latching mechanism.

The main pole is attached to the piston, has an upwardly angled ramp at a rear end, located behind the control notch. The ramp guides the rib into the control notch. The main pole moves rearwardly in a channel in the supporting stock during the cocking action. The releasing bracket retains the main pole in a first, cocked position as the rib engages the control notch. The bracket releases the main pole to a second, fired position as the trigger is moved rearwardly, elevating the releasing bracket and raising the rib from the control notch. This allows the main pole and the piston to move forward as urged by the compression spring, pressurizing the cylinder.

(6) In a further variant, the projectile storage magazine further includes a conical container. The container has a circular opening at a lower end. The lower end is fitted sealably to an upper end of a vertical circular opening through the chamber. The container has a sealing lid removably or hingedly attached at an upper end.

(7) In still a further variant, the lower end of the container is fitted sealably to the upper end of said vertical circular opening through the chamber with a sealing washer.

(8) In yet a further variant, the projectile loading mechanism further includes a metering rod. The metering rod is sized and shaped to fit sealably through the vertical circular opening through the chamber and has an orthogonal activation bar extending from its lower end and a through hole located above the activation bar. The through hole is orthogonal to the bar and the metering rod and sized and located to align with the chamber when the bar is positioned against a stopping surface. The activation bar is urged upwardly by a return compression spring to rest against the lower end of the vertical circular opening in the chamber.

The through hole fills with the particulate projectiles when located above the chamber in the conical container during the cocking action. The activation bar is urged downwardly by a pivotally mounted subordination pole to rest against the stopping surface just after activation of the compressed gas release mechanism. This permits the compressed gas to eject the particulate projectiles from the chamber and through the barrel.

(9) In another variant of the invention, the projectile loading mechanism further includes a mid-chamber pipe. The pipe extends downwardly from a lower end of the magazine. A lower portion of the pipe provides a stop for one end of a return compression spring. A trajectory guide is provided. The guide is located below the lower end of the magazine, has a hollow bore sized to fit slidably about the pipe and has a vertical slot that extends downwardly from the lower end for a first predetermined distance. The slot terminates in a stopping surface. The trajectory guide is located about the pipe and provides a support platform for attachment of the projectile storage magazine. A metering rod is provided. The rod is cylindrical in shape and is sized to fit slidably within the pipe and has an orthogonal activation bar extending from its lower end. The metering rod has a through hole located above the activation bar. The through hole is orthogonal to the bar and the metering rod and is sized and located to align with the chamber when the bar is positioned against the stopping surface. The return compression spring urges the metering rod upwardly to rest against the lower end of the vertical circular opening in the chamber. A subordination pole is provided. The pole has a first end and a second end and is pivotally mounted to a cover for the compressed gas source. The first end of the subordination pole includes a metering slot. The metering slot surrounds the activation bar. The second end of the subordination pole is urged upwardly by a cam upon activation of the gas release mechanism. Upward movement of the second end of the subordination pole moves the activation bar downwardly, compresses the return compression spring and aligns the through hole of the metering rod with the chamber. This permits the compressed gas to drive the particulate projectiles out of the chamber and through the barrel. Downward movement of the second end of the subordination pole causes the activation bar to move upwardly as urged by the return compression spring. This allows the particulate projectiles to fill the through hole of the metering rod as it moves in the projectile storage magazine surrounded by the particulate projectiles.

(10) In still another variant, the spring compression mechanism further includes a primary gear rack. The gear rack is slidably located in a channel in the supporting stock, has gear teeth located upon an upper surface and has mounting fixtures adjacent a forward end for attachment of a slide handle. A reduction gear drive is provided. The gear drive is mounted to an outer cover of the cylinder. A secondary gear rack is provided. The secondary rack is attached indirectly to the piston and is located slidably in a slot in the outer cover above the reduction gear drive. The primary gear rack engages the reduction gear drive and the reduction gear drive engaging the secondary gear rack. Rearward movement of the slide handle moves the primary gear rack rearward, rotates the reduction gear drive, moves the secondary gear rack rearward and moves the piston rearward, compressing the compression spring.

(11) In yet another variant, a downward pointing cam lobe is provided. The cam lobe is located beneath and orthogonal to the metering slot. A cam activating tab is provided. The tab is located adjacent to a side edge and front end of an upper surface of the primary gear rack. The activating tab has a contoured inner surface. The contoured inner surface is sized, shaped and located to engage a front edge of the cam lobe as the primary gear rack is moved rearwardly and forwardly during operation of the cocking mechanism. Engagement of the cam lobe causes upward movement of the metering rod followed by downward movement of the metering rod during operation of the cocking mechanism. Such movement serving to dislodge any particulate projectiles adhering to the metering rod.

(12) In a further variant, engagement of the cam lobe by the cam activating tab during forward movement of the primary gear rack during operation of the cocking mechanism provides an auditory confirmation of completion of the operation.

(13) In still a further variant, a control slot, moving in concert with main pole, maintains a first end of an internal safety pivot in an elevated position during rearward movement of the control slot. This causes a second end of the pivot, which has a downward facing notch, to engage an upper protrusion at an upper end of a trigger of the compressed gas release mechanism, thereby preventing activation of the mechanism. The control slot causes downward movement of the internal safety pivot, upon completion of forward movement of the primary gear rack and the control slot. The downward movement permits release of the downward facing notch from the trigger and permits activation of the gas release mechanism.

(14) In yet a further variant, the support stock further includes a sight glass. The sight glass is positioned adjacent the magazine and permits a view of a level of the particulate projectiles contained in the magazine.

(15) In another variant, the gun uses a prefilled $CO_2$ cartridge as a compressed gas source and the gun further includes a cylindrical cartridge chamber. The cartridge chamber is sized and shaped to enclose a $CO_2$ cartridge and has a sealable opening at a first end for introduction of the cartridge. A concave seat located at a second end is provided. The seat is sized and shaped to fit sealably about a discharging end of the cartridge. A hollow puncturing needle is located within the seat. A sealing cap is provided. The cap is removably attached to the cartridge chamber by mating screw threads. Tightening of the cap urges the cartridge against the puncturing needle. A pressure vessel is provided. The pressure vessel is fluidly connected to a metering device. The metering device permits a predetermined charge of compressed gas to enter the chamber upon activation of the compressed gas release mechanism.

(16) In still another variant, the compressed gas release mechanism further includes a trigger. The trigger is urged forward by a trigger return spring. The trigger has an upper protrusion. The upper protrusion engages an internal safety pivot. The safety pivot prevents activation of the compressed gas release mechanism unless the cocking action is completed. The trigger has an elevating ramp located rewardly of the upper protrusion. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a loading rod. The loading rod is urged forward by a loading coil spring, has an upwardly angled ramp at a rear end, located behind the control notch. The ramp guides the rib into the control notch.

The loading rod moves rearwardly in a channel in the supporting stock during the cocking action. The releasing bracket retains the loading rod in a first, cocked position as the rib engages the control notch. The releasing bracket releases the loading rod to a second, fired position as the trigger is moved rearwardly, elevating the releasing bracket and raising the rib from the control notch. This allows the loading rod to move forward as urged by the loading coil spring. The loading rod activates the projectile loading mechanism and the metering device.

(17) In yet another variant of the invention, the gun uses a pneumatically pumped air reservoir as a compressed gas source and the gun further includes a gas cylinder. The cylinder has an inlet valve and an outlet valve. A piston is provided. The piston fits sealably within the cylinder. A pumping mechanism is provided. The pumping mechanism is mechanically linked to the piston and moves the piston from an extended position to a compressed position within the cylinder. The inlet valve is in an open position as the piston moves from the compressed position to the extended position and is in a closed position as the piston moves from the extended position to the compressed position. The outlet valve is in a closed position as the piston moves from the compressed position to the extended position and is in an open position as the piston moves from the extended position to the compressed position.

The air reservoir is fluidly connected to the outlet valve and the chamber. The projectile loading mechanism permits a predetermined charge of compressed gas to enter the chamber upon activation of the compressed gas release mechanism. Repeated movement of the piston by the pumping mechanism from the extended position to the compressed position within the cylinder will increase pressure within the air reservoir, permitting the particulate projectiles to be ejected from the chamber with increased force upon release of the pressure by the compressed gas release mechanism.

(18) In a further variant, the compressed gas release mechanism further includes a trigger. The trigger is urged forward by a trigger return spring. The trigger has an upper protrusion. The upper protrusion engages an internal safety pivot. The safety pivot prevents activation of the compressed gas release mechanism unless the cocking action is completed. The trigger has an elevating ramp located rearwardly of the upper protrusion. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a loading rod. The loading rod is urged forward by a loading coil spring, has an upwardly angled ramp at a rear end, located behind the control notch. The ramp guides the rib into the control notch.

The loading rod moves rearwardly in a channel in the supporting stock during the cocking action. The releasing bracket retains the loading rod in a first, cocked position as the rib engages the control notch. The releasing bracket releases the loading rod to a second, fired position as the trigger is moved rearwardly, elevating the releasing bracket and raising the rib from the control notch. This allows the loading rod to move forward as urged by the loading coil spring. The loading rod activates the projectile loading mechanism.

(19) In still a further variant, the gun uses a refillable compressed gas cylinder as a compressed gas source. The cylinder has a shut off valve and an attachment fitting located adjacent a first end. A mating attachment fitting is provided. The mating fitting is mounted to the support stock and is fluidly connected to a metering device. The metering device is fluidly connected to the chamber and the metering device permits a predetermined charge of compressed gas to enter the chamber upon activation of the compressed gas release mechanism. A charged refillable compressed gas cylinder is attached to the mating attachment fitting, the shut off valve is opened and the compressed gas is released by the metering device upon activation of the compressed gas release mechanism.

(20) In yet a further variant, the compressed gas release mechanism further includes a trigger. The trigger is urged forward by a trigger return spring. The trigger has an upper protrusion. The upper protrusion engages an internal safety pivot. The safety pivot prevents activation of the compressed gas release mechanism unless the cocking action is completed. The trigger has an elevating ramp located rearwardly of the upper protrusion. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a loading rod. The loading rod is urged forward by a loading coil spring, has an upwardly angled ramp at a rear end, located behind the control notch. The ramp guides the rib into the control notch.

The loading rod moves rearwardly in a channel in the supporting stock during the cocking action. The releasing bracket retains the loading rod in a first, cocked position as the rib engages the control notch. The releasing bracket releases the loading rod to a second, fired position as the trigger is moved rearwardly, elevating the releasing bracket and raising the rib from the control notch. This allows the loading rod to move forward as urged by the loading coil spring. The loading rod activates the projectile loading mechanism and the metering device.

(21) In another variant, the gun uses an external compressed gas line as a compressed gas source and the gun further includes an external compressed gas line. The line is connected to a compressed gas source and has a shut off valve and an attachment fitting located adjacent a first end. A mating attachment fitting is provided. The mating fitting is mounted to the support stock and is fluidly connected to a metering device. The metering device is fluidly connected to the chamber. The metering device permits a predetermined charge of compressed gas to enter the chamber upon activation of the compressed gas release mechanism. The external compressed gas line is attached to the mating attachment fitting, the shut off valve is opened and the compressed gas is released by the metering device upon activation of the compressed gas release mechanism.

(22) In still another variant, the compressed gas release mechanism further includes a trigger. The trigger is urged forward by a trigger return spring. The trigger has an upper protrusion. The upper protrusion engages an internal safety pivot. The safety pivot prevents activation of the compressed gas release mechanism unless the cocking action is completed. The trigger has an elevating ramp located rearwardly of the upper protrusion. The elevating ramp urges a releasing bracket of the latching mechanism upwardly against a downwardly urging compression spring as the trigger is moved rearwardly. The releasing bracket moves slidably within a vertical channel in the supporting stock and has a downwardly facing rib. The rib releasably engages an upwardly facing control notch in a loading rod. The loading rod is urged forward by a loading coil spring, has an upwardly angled ramp at a rear end, located behind the control notch. The ramp guides the rib into the control notch.

The loading rod moves rearwardly in a channel in the supporting stock during the cocking action. The releasing bracket retains the loading rod in a first, cocked position as the rib engages the control notch. The releasing bracket releases the loading rod to a second, fired position as the trigger is moved rearwardly, elevating the releasing bracket and raising the rib from the control notch. This allows the loading rod to move forward as urged by the loading coil spring. The loading rod activates the projectile loading mechanism and the metering device.

(23) In yet another variant of the invention, a pistol grip and a forearm of the support stock have flattened lower surfaces. The flattened surfaces permit the bug killing gun to be balanced in an upright position for adding the particulate projectiles to the projectile storage magazine.

(24) In a further variant of the invention, the improved bug killing gun further includes a laser sighting device. The laser sighting device includes a battery powered laser. The laser is capable of producing a laser aiming spot. A housing is provided. The housing is adapted to contain the laser, a battery power source and a control circuit for the laser. An attachment mechanism is provided. The attachment mechanism is adapted to attach the laser sighting device adjacent a distal end of the barrel.

(25) In still a further variant, the attachment mechanism is integrally formed with the distal end of the barrel.

(26) In yet a further variant, the attachment mechanism is adapted to removably attach the laser sighting device to the distal end of the barrel.

(27) In another variant, the laser sighting device includes elevation and windage adjustments for an aiming point of the laser aiming spot.

(28) In still another variant, a power switch is provided. The switch controls power to the laser.

(29) In yet another variant, the power switch is mounted on the housing.

(30) In a final variant of the invention, the power switch is integral with the trigger. Initial rearward movement of the trigger completes a circuit within the power switch, thereby providing the laser aiming spot prior to activation of the compressed gas release mechanism.

An appreciation of the other aims and objectives of the present invention and an understanding of it may be achieved by referring to the accompanying drawings and the detailed description of a preferred embodiment.

DESCRIPTION OF THE DRAWINGS

FIG. 3B is an orthogonal cross-sectional detailed view of the projectile storage magazine and projectile loading mechanism in the firing position taken along the line 3C-3C;

FIG. 3C is an orthogonal cross-sectional detailed view of the projectile storage magazine and projectile loading mechanism in the projectile loading position taken along the line 3C-3C;

FIG. 17A is a detailed view of a trigger-operated on/off switch; and

DETAILED DESCRIPTION OF THE PREFERRED EMBODIMENT (1) FIGS. 1-11 illustrate an improved bug killing gun 10 providing the desired features that may be constructed from the following components. As illustrated in FIGS. 10 and 11, a compressed gas source 14 is provided. A chamber 18 is provided. The chamber 18 is fluidly connected to the compressed gas source 14. A barrel 22 is provided. The barrel 22 is located at a distal end 26 of the chamber 18. As illustrated in FIGS. 5 and 6, a compressed gas release mechanism 30 is provided. The release mechanism 30 is connected to the compressed gas source 14. As illustrated in FIGS. 1-4, 10 and 11, a projectile storage magazine 34 is provided. The magazine 34 stores particulate projectiles 38 and is located adjacent the chamber 18. A projectile loading mechanism 42 is provided. The loading mechanism 42 moves the particulate projectiles 38 into the chamber 18 from the magazine 34. A cocking mechanism 46 is mechanically connected to the compressed gas source 14, the compressed gas release mechanism 30, and the projectile loading mechanism 42. As illustrated in FIGS. 7-9, a primary automatic safety mechanism 54 is provided. The primary safety mechanism 54 moves to an activated position 62 upon utilization of the cocking mechanism 46 and moves to a deactivated position 58 when manually deactivated by a user. The status of the primary 54 safety mechanism is displayed by movement of a primary external safety lever 66 from a first, safe position 70 to a second, firing position 74, as illustrated in FIG. 2. A stock 50 is provided. The stock 50 houses and supports the compressed gas source 14, the compressed gas release mechanism 30, the barrel 22, the chamber 18, the projectile storage magazine 34, the cocking mechanism 46 and the projectile loading mechanism 42. When the gun 10 is cocked by the cocking mechanism 46, the projectile loading mechanism 42 gathers a predetermined quantity of the particulate projectiles 38 and positions the projectiles 38 in the chamber 18. When the compressed gas release mechanism 30 is activated the projectiles 38 are ejected from the chamber 18 into the barrel 22 and expelled from the gun 10.

(2) In a variant of the invention, as illustrated in FIGS. 1, 2, 3A, 5 and 6, a secondary safety indicator 78 is provided. The secondary safety indicator 78 is moved from a hidden position 82 to a visible position 86 by the gun cocking action and is moved to the hidden position 82 by activation of the compressed gas release mechanism 30.

Figure 10:
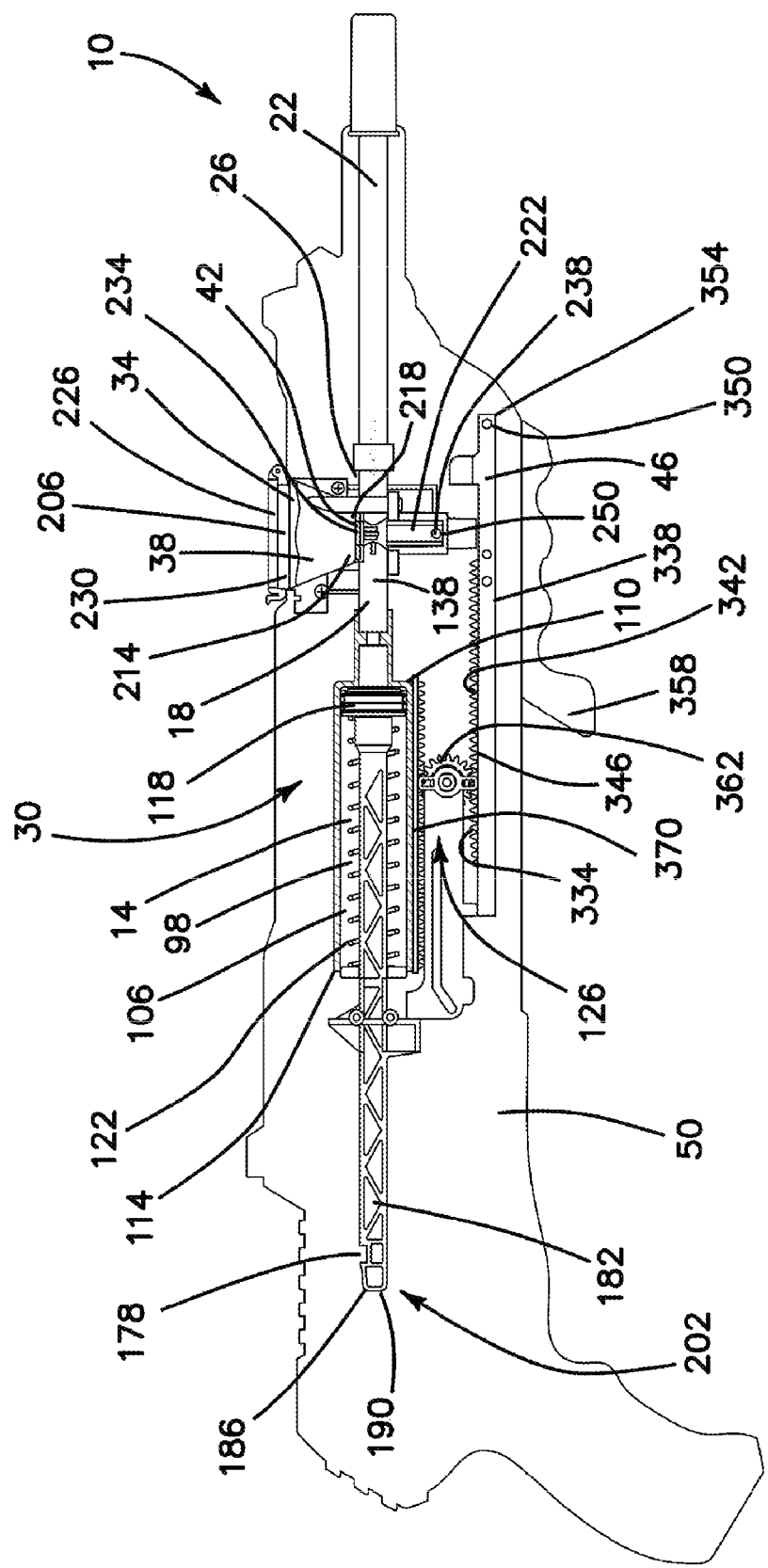
FIG. 10 is a side cross-sectional view of the FIG. 1 embodiment illustrating the spring-activated compressed gas chamber as the bug gun is firing.
Figure 11:
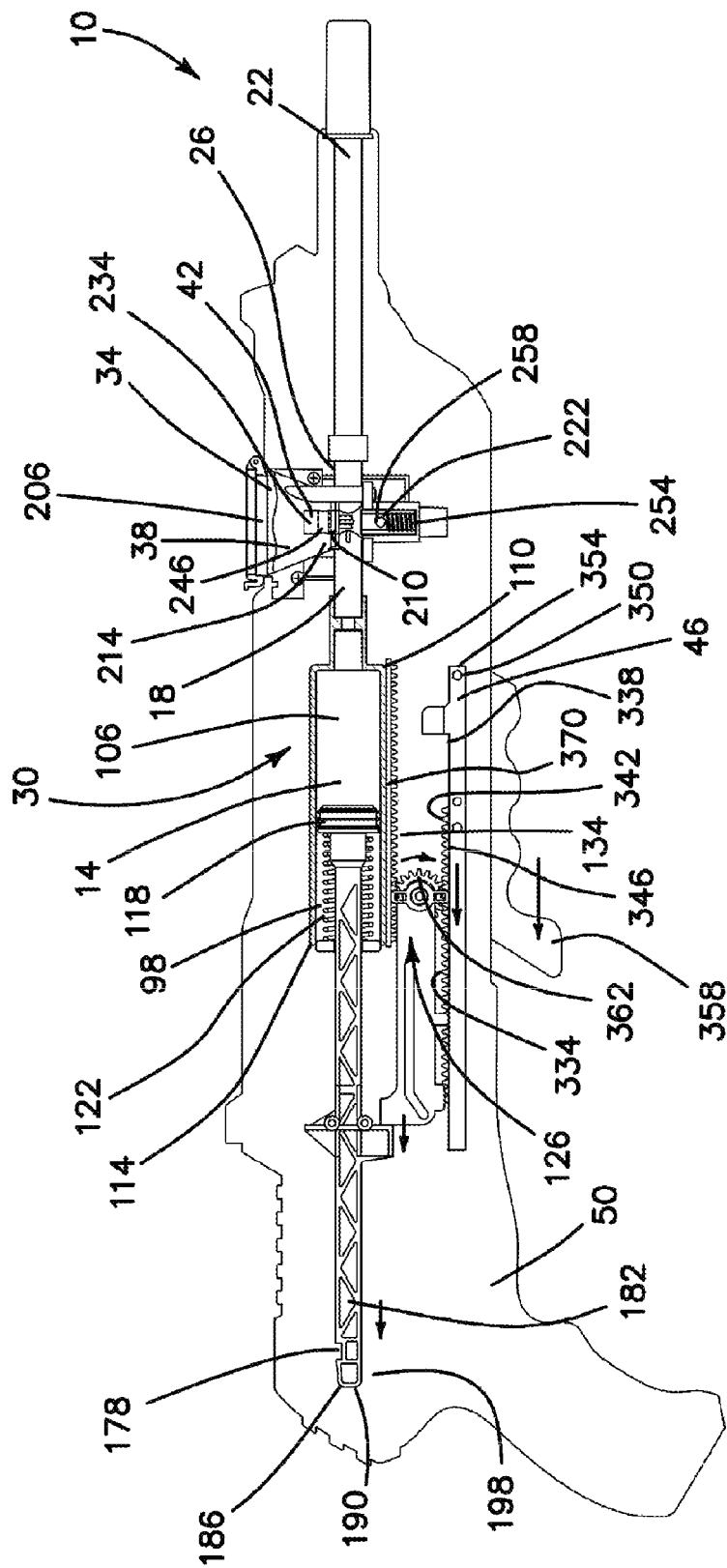
FIG. 11 is a side cross-sectional view of the FIG. 1 embodiment illustrating the spring-activated compressed gas chamber with the bug gun in cocked position.
Figure 12:
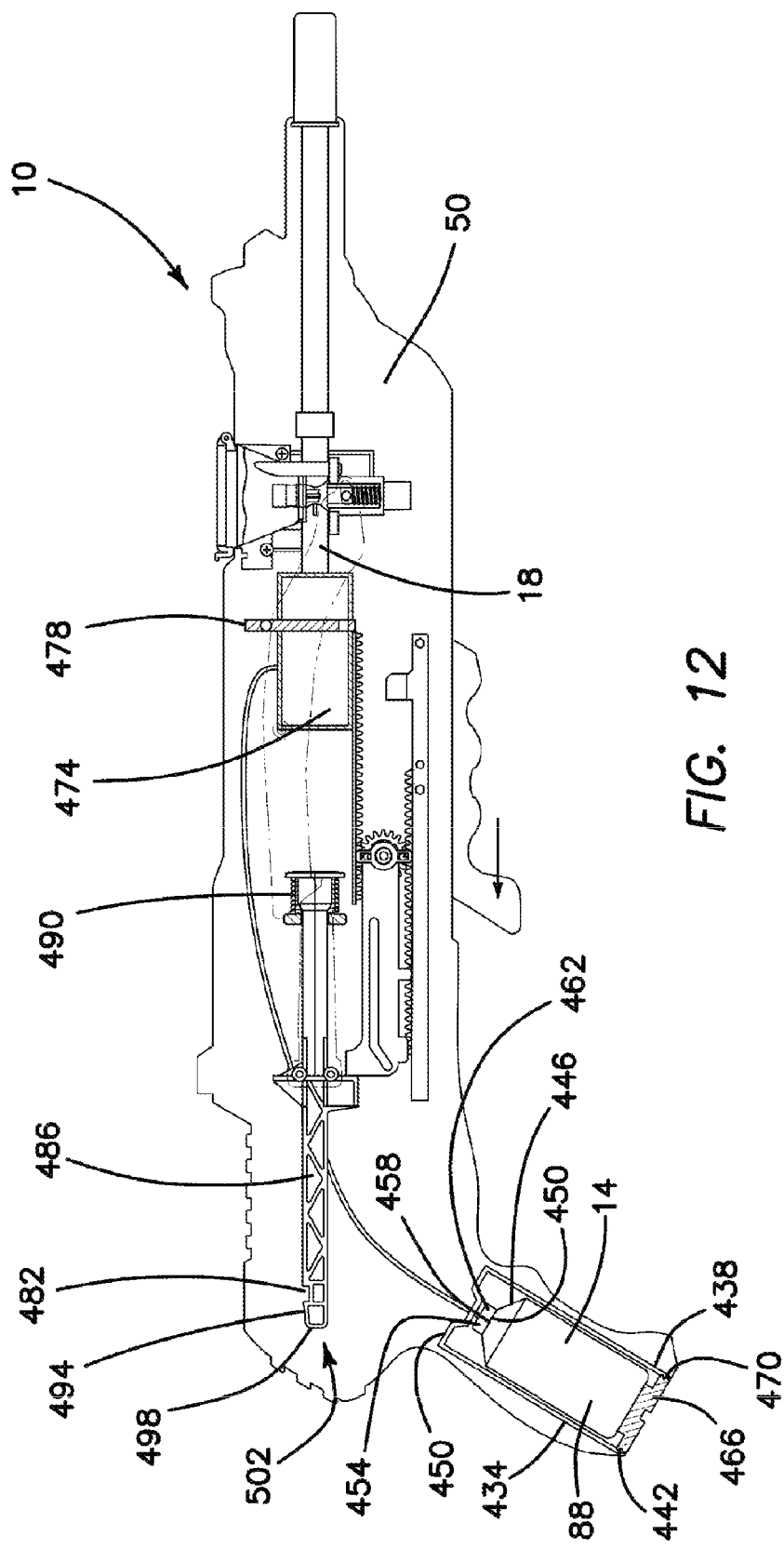
FIG. 12 is a side cross-sectional view of a $CO_2$ powered embodiment of the bug gun illustrating the metering device and latching mechanism in the cocked position.
Figure 13:
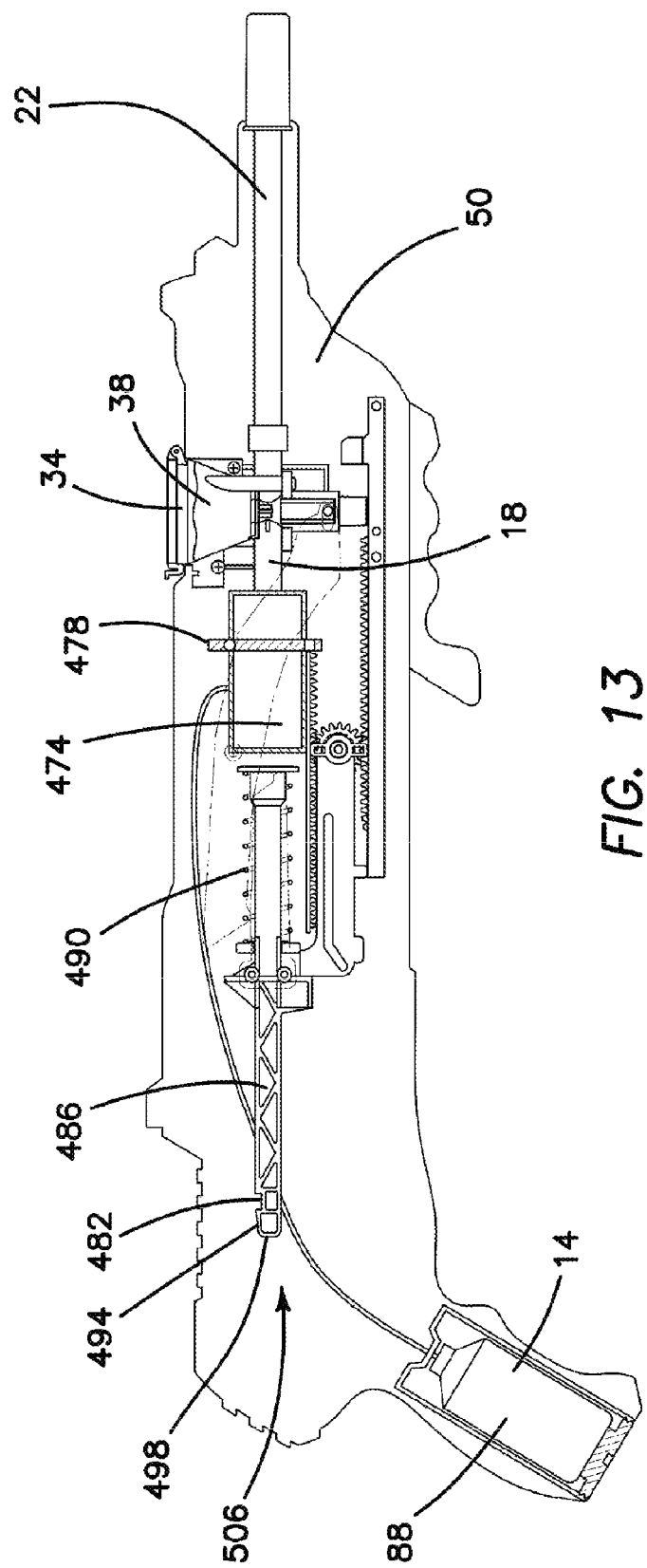
FIG. 13 is a side cross-sectional view of the FIG. 12 embodiment of bug gun illustrating the metering device and latching mechanism in the fired position.
Figure 14:
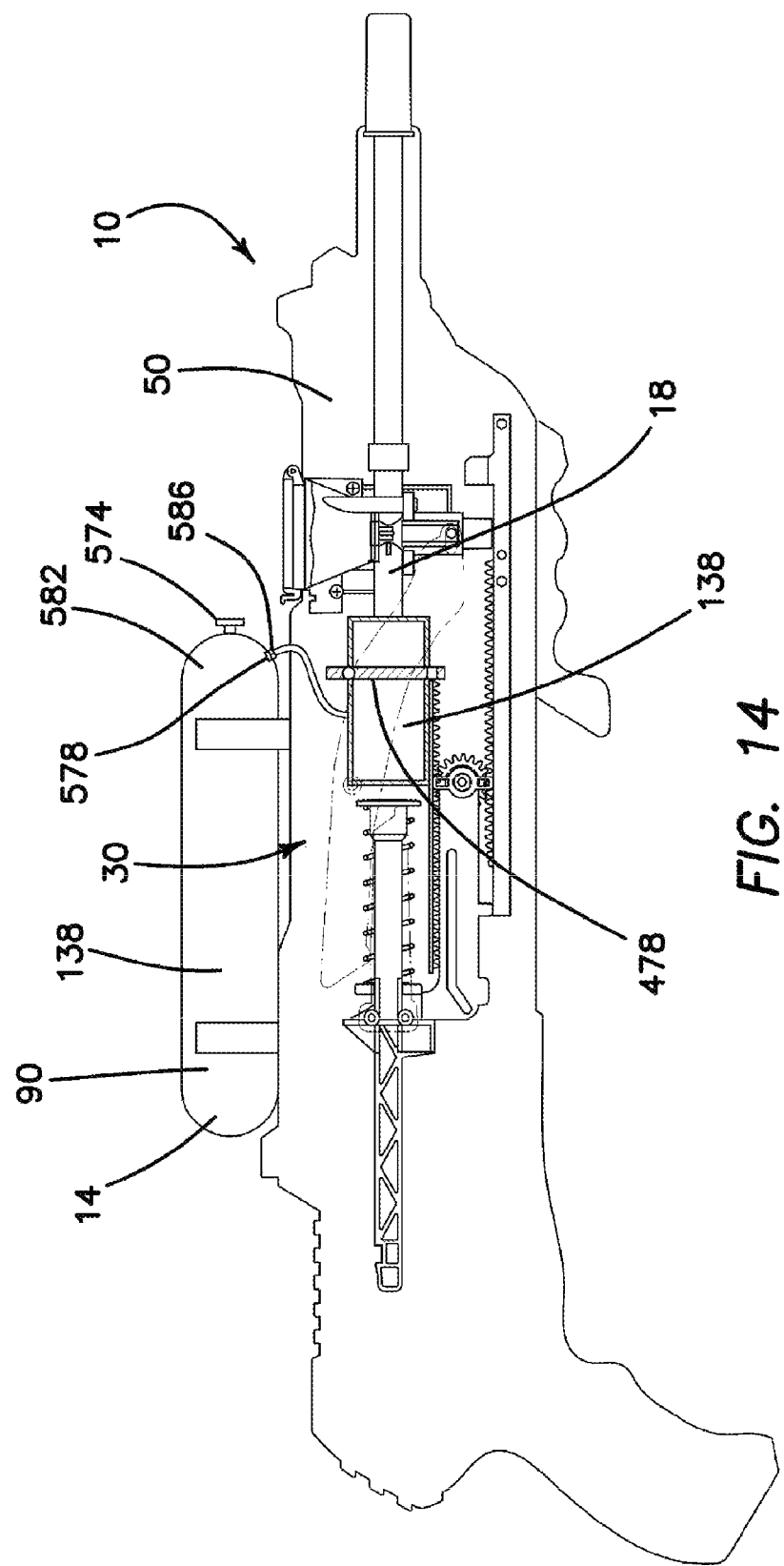
FIG. 14 is a side cross-sectional view of a refillable air cylinder powered embodiment of the bug gun illustrating attachment of the cylinder and connection to the metering device.
Figure 15:
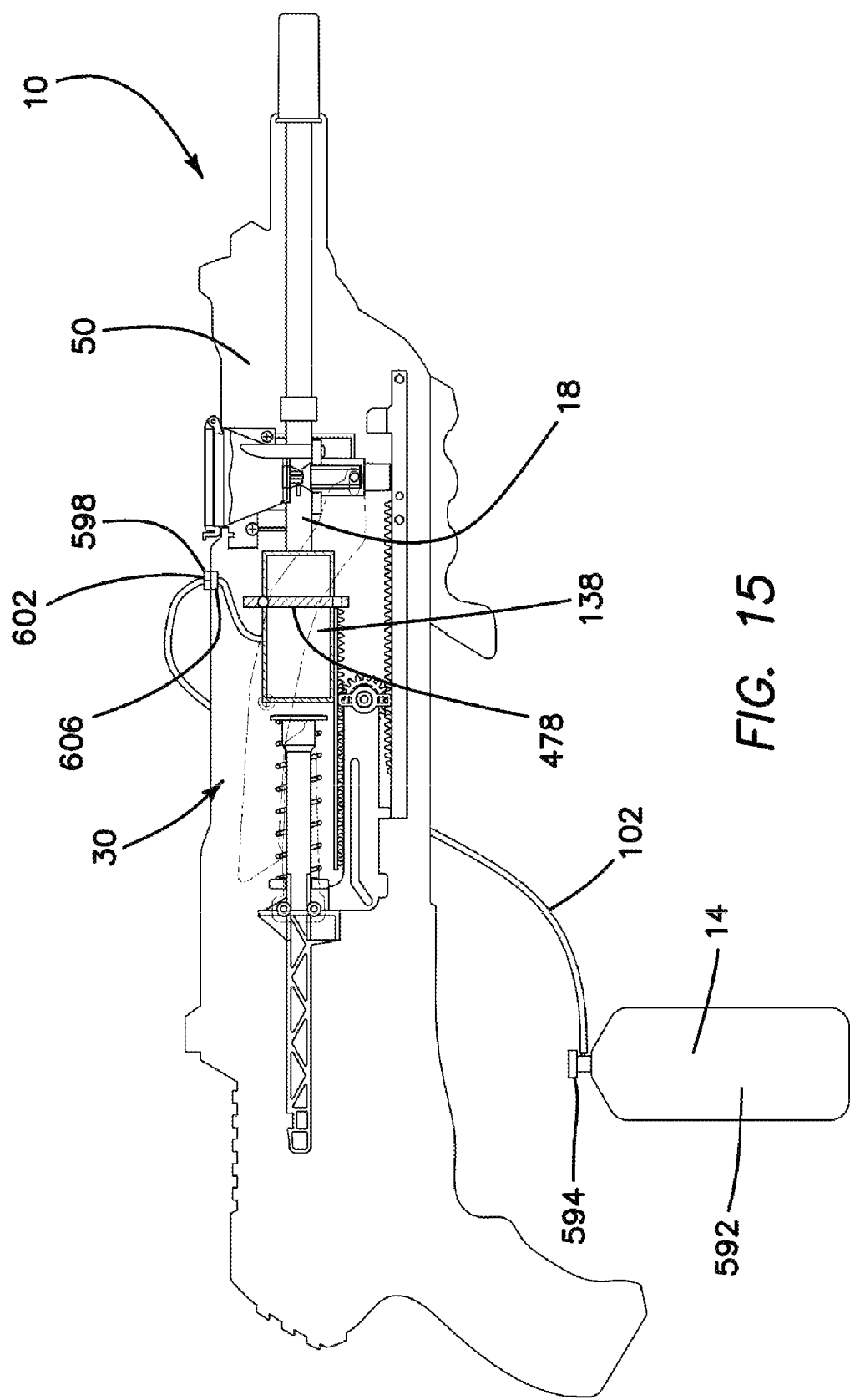
FIG. 15 is a side cross-sectional view of an external compressed gas line powered embodiment of the bug gun illustrating attachment of the gas line and connection to the metering device.
Figure 16:
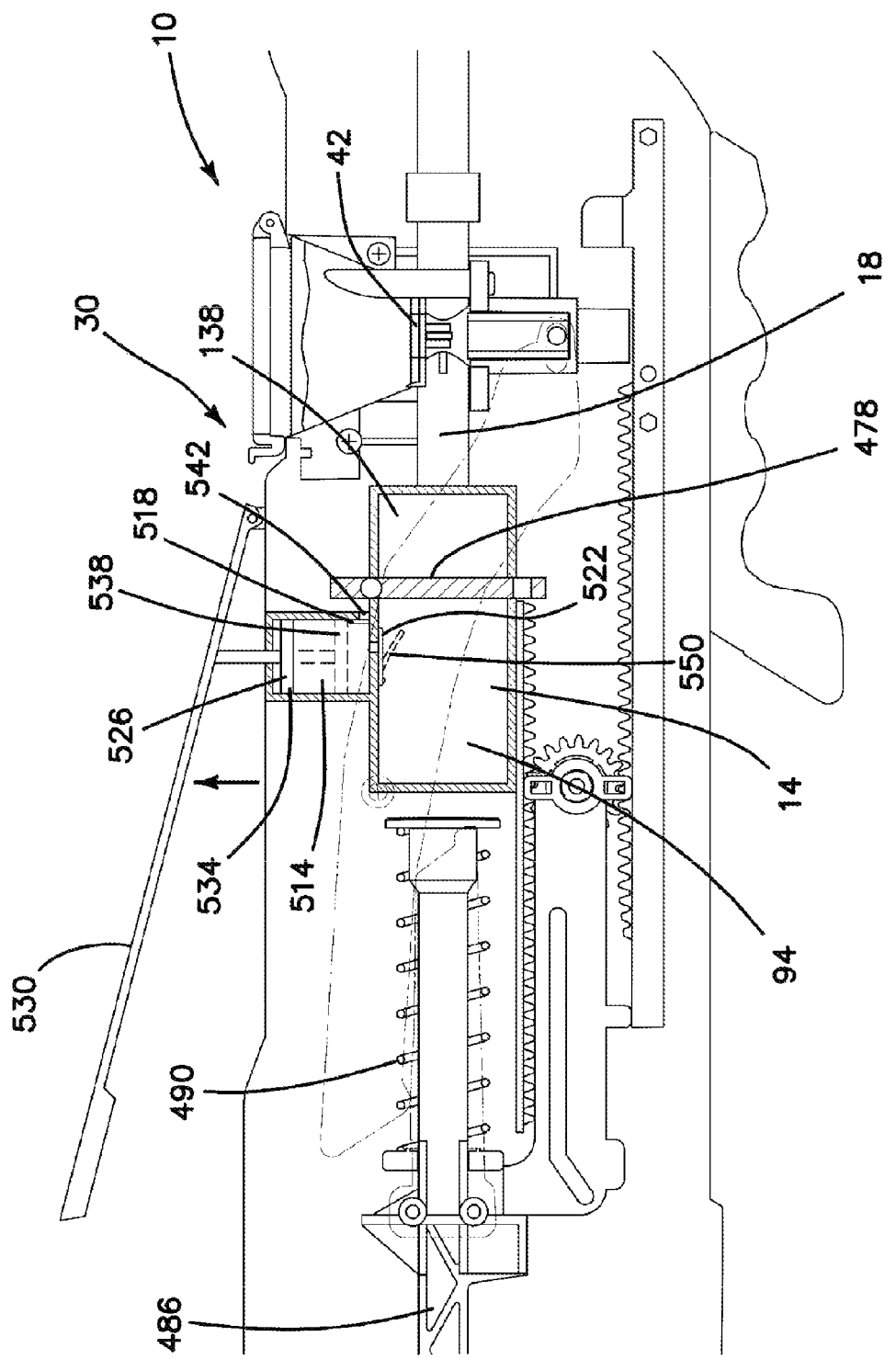
FIG. 16 is a side cross-sectional view of a pneumatically pump powered embodiment of the bug gun illustrating the pumping mechanism and valving connecting to the metering device.

(3) In another variant, the compressed gas source 14 is selected from the group that includes a prefilled $CO_2$ cartridge 88 as illustrated in FIGS. 12 and 13, a refillable compressed gas cylinder 90 as illustrated in FIG. 14, a pneumatically pumped air reservoir 94 as illustrated in FIG. 16, a spring-activated compressed gas chamber 98, as illustrated in FIGS. 10 and 11, and an external compressed gas line 102 as illustrated in FIG. 15.

Figure 5:
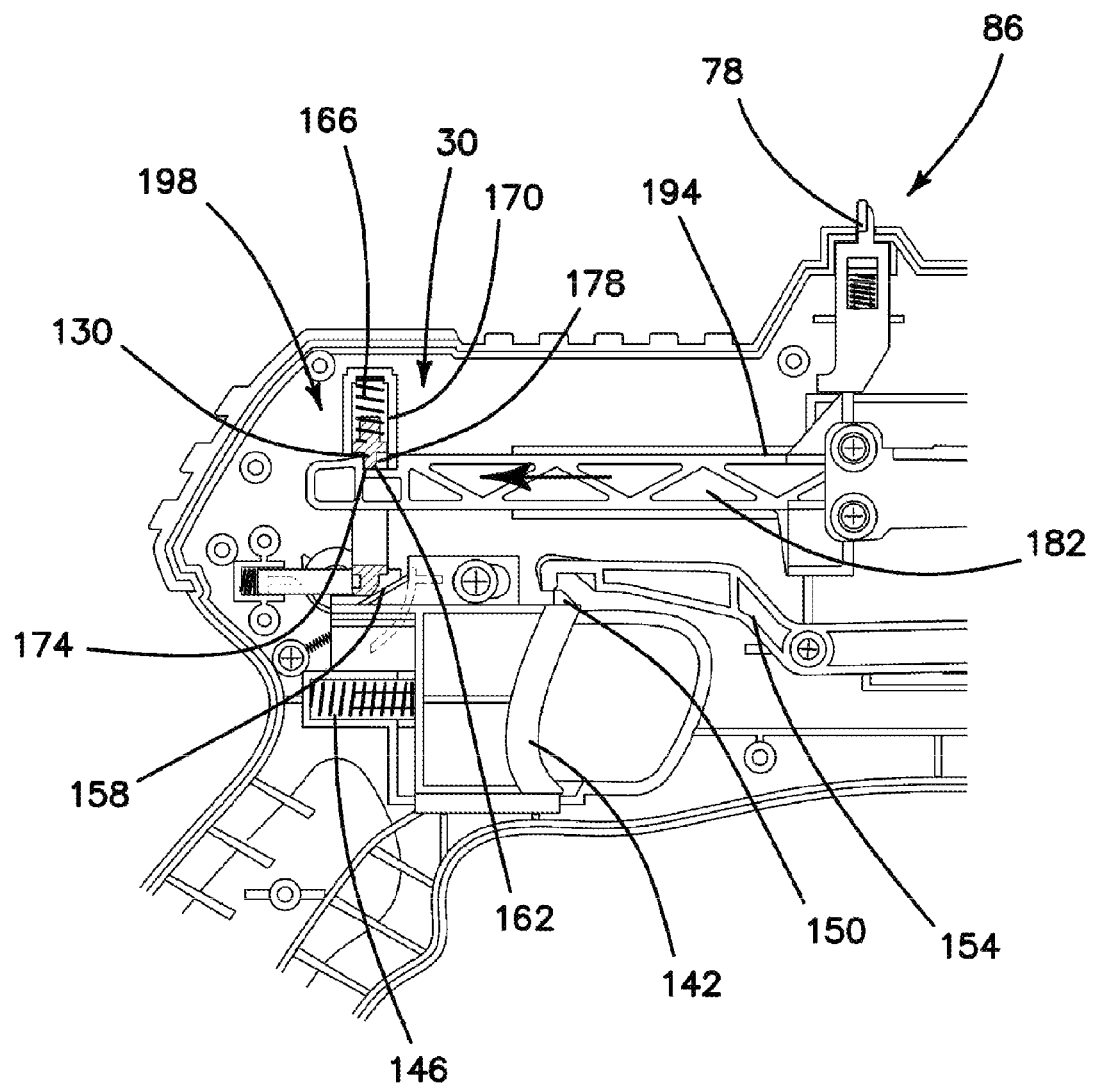
FIG. 5 is a partial side elevational cross-section of the FIG. 1 embodiment further illustrating details of the trigger and latching mechanism in the cocked position and illustrating the sight/firing ready indicator in the elevated position.
Figure 6:
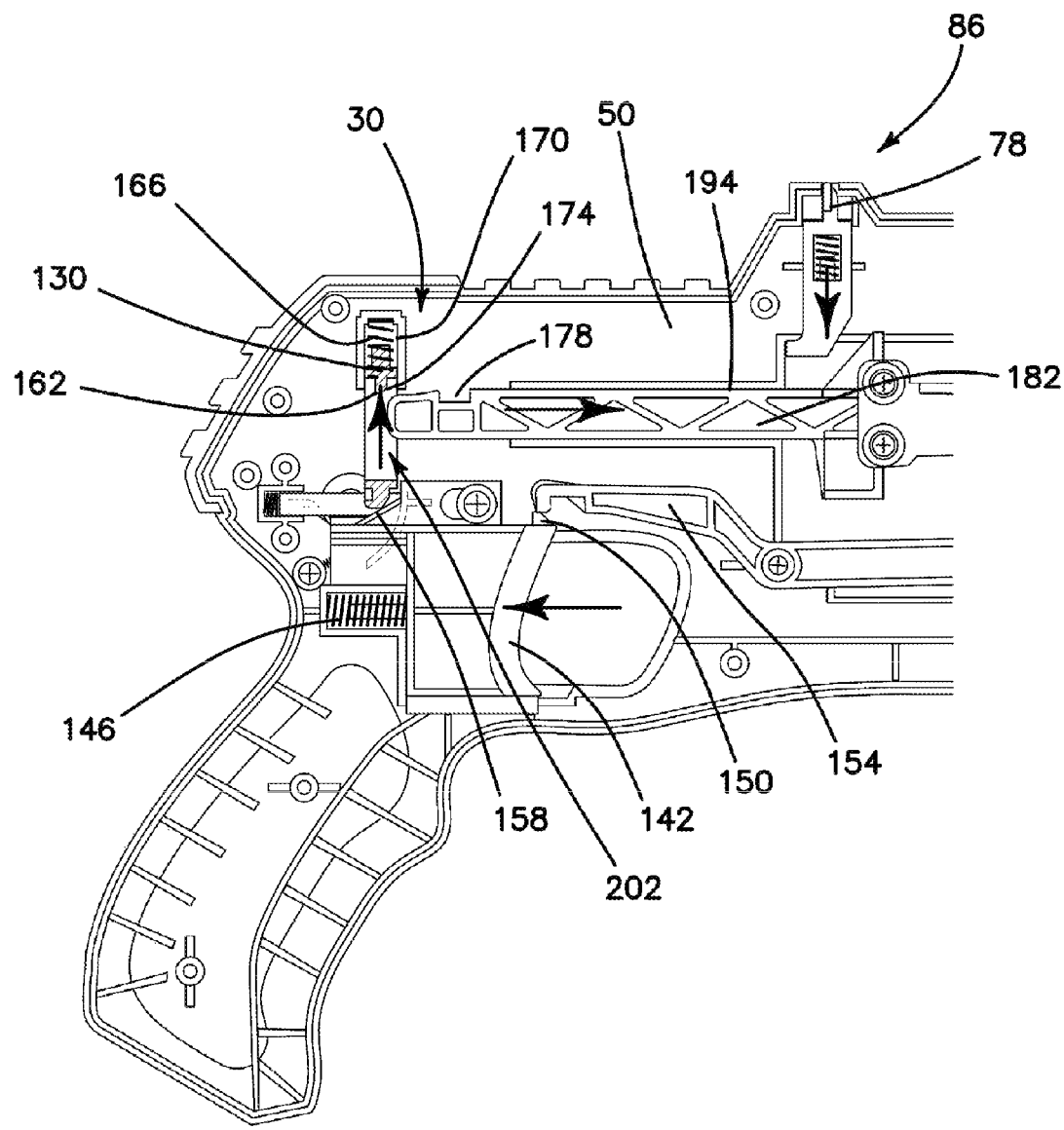
FIG. 6 is a partial side elevational cross-section of the FIG. 1 embodiment further illustrating details of the trigger and latching mechanism in the firing position and illustrating the sight/firing ready indicator in the lowered position.
Figure 7:
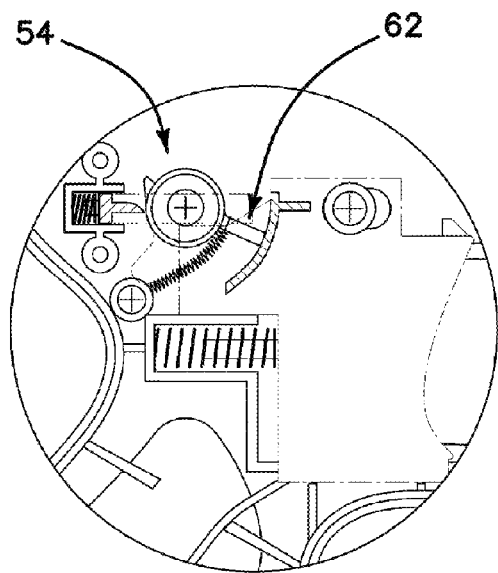
FIG. 7 is a side cross-sectional view of the manual safety in the safe position illustrating the blocking of movement of the trigger.
Figure 8:
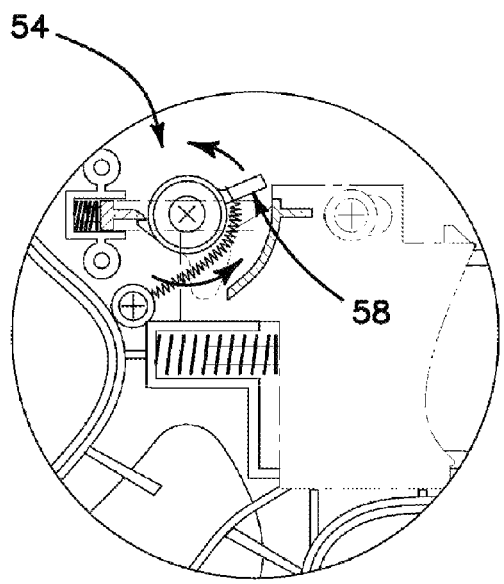
FIG. 8 is a side cross-sectional view of the manual safety in the fire position illustrating the unblocking of movement of the trigger prior to firing.
Figure 9:
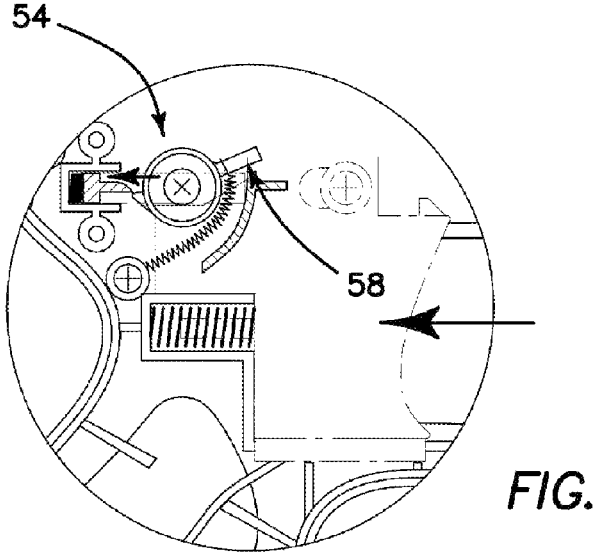
FIG. 9 is a side cross-sectional view of the manual safety in the fire position illustrating rearward movement of the trigger during firing.

(4) In still another variant, as illustrated in FIGS. 10 and 11, the spring-activated compressed gas chamber 98 further includes a cylinder 106. The cylinder 106 has a front end 110 and a rear end 114 and is fluidly connected to the chamber 18 at the front end 110. A piston 118 is provided. The piston 118 fits sealably in the cylinder 106 and is located within it. A compression spring 122 is provided. The compression spring 122 urges the piston 118 toward the front end 110. A spring compression mechanism 126 is provided. The compression mechanism 126 urges the piston 118 towards the rear end 114 and compresses the spring 122. As illustrated in FIGS. 5 and 6, a latching mechanism 130 is provided. The latching mechanism 130 releasably retains the piston 118 adjacent the rear end 114 and retains the compression spring 122 in a compressed state 134. A user performs the gun cocking action, the spring compression mechanism 126 is operated, the piston 118 is urged toward the rear end 114 of the cylinder 106, the spring 122 is compressed and the spring 122 and the piston 118 are retained by the latching mechanism 130 until released, allowing the piston 118 to move rapidly toward the front end 110 of the cylinder 106. This provides a burst of compressed gas 138 in the cylinder 106 and to the connected chamber 18.

(5) In yet another variant, as illustrated in FIGS. 5 and 6, the compressed gas release mechanism 30 further includes a trigger 142. The trigger 142 is urged forward by a trigger return spring 146. The trigger 142 has an upper protrusion 150. The upper protrusion 150 engages an internal safety pivot 154. The safety pivot 154 prevents release of the latching mechanism 130 unless the cocking action is completed. The trigger 142 has an elevating ramp 158 located rewardly of the upper protrusion 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 178 in a main pole 182 of the latching mechanism 130.

As illustrated in FIGS. 10 and 11, the main pole 182 is attached to the piston 118, has an upwardly angled ramp 186 at a rear end 190, located behind the control notch 178. The ramp 186 guides the rib 174 into the control notch 178. The main pole 182 moves rearwardly in a channel 194 in the supporting stock 50 during the cocking action, as illustrated in FIGS. 3A, 5 and 6. The releasing bracket 162 retains the main pole 182 in a first, cocked position 198 as the rib 174 engages the control notch 178. The bracket 162 releases the main pole 182 to a second, fired position 202 as the trigger 142 is moved rearwardly, elevating the releasing bracket 162 and raising the rib 174 from the control notch 178. This allows the main pole 182 and the piston 118 to move forward as urged by the tension spring 122, pressurizing the cylinder 106.

(6) In a further variant, as illustrated in FIGS. 3B, 3C, 10 and 11, the projectile storage magazine 34 further includes a conical container 206. The container 206 has a circular opening 210 at a lower end 214. The lower end 214 is fitted sealably to an upper end 218 of a vertical circular opening 222 through the chamber 18. The container 206 has a sealing lid 226 removably or hingedly attached at an upper end 230.

(7) In still a further variant, as illustrated in FIG. 3C, the lower end 214 is fitted sealably to an upper end 218 of a vertical circular opening 222 through the chamber 18 with a sealing washer 224.

(8) In yet a further variant, as illustrated in FIGS. 3, 3B, 3C, 4, 4A, 4B, 10 and 11, the projectile loading mechanism 42 further includes a metering rod 234. The metering rod 234 is sized and shaped to fit sealably through the vertical circular opening 222 through the chamber 18 and has an orthogonal activation bar 238 extending from its lower end 242 and a through hole 246 located above the activation bar 238. The through hole 246 is orthogonal to the bar 238 and metering rod 234 and sized and located to align with the chamber 18 when the bar 238 is positioned against a stopping surface 250. The activation bar 238 is urged upwardly by a return compression spring 254 to rest against a lower end 258 of the vertical circular opening 222 in the chamber 18.

The through hole 246 fills with the particulate projectiles 38 when located above the chamber 18 in the conical container 206 during the cocking action. The activation bar 238 is urged downwardly by a pivotally mounted subordination pole 262 to rest against the stopping surface 250 just after activation of the compressed gas release mechanism 30. This permits the compressed gas 138 to eject the particulate projectiles 38 from the chamber 18 and through the barrel 22.

(9) In another variant of the invention, the projectile loading mechanism 42 further includes a mid-chamber pipe 266. The pipe 266 extends downwardly from a lower end 258 of the magazine 34. A lower portion 282 of the pipe 266 provides a stop 286 for one end 290 of a return compression spring 254. A trajectory guide 298 is provided. The guide 298 is located below the lower end 258 of the magazine 34, has a hollow bore 302 sized to fit slidably about the pipe 266 and has a vertical slot 306 that extends downwardly from the lower end 258 for a first predetermined distance 308. The slot 306 terminates in a stopping surface 250. The trajectory guide 298 is located about the pipe 266 and provides a support platform 310 for attachment of the projectile storage magazine 34. A metering rod 234 is provided. The rod 234 is cylindrical in shape and is sized to fit slidably within the pipe 266 and has an orthogonal activation bar 238 extending from its lower end 242. The metering rod 234 has a through hole 246 located above the activation bar 238. The through hole 246 is orthogonal to the bar 238 and the metering rod 234 and sized and located to align with the chamber 18 when the bar 238 is positioned against the stopping surface 250. A return compression spring 254 urges the metering rod 234 upwardly to rest against a lower end 258 of the vertical circular opening 222 in the chamber 18. A subordination pole 262 is provided. The pole 262 has a first end 314 and a second end 318 and is pivotally mounted to a cover 322 for the compressed gas source 14. The first end 314 of the subordination pole 262 includes a metering slot 264 that surrounds activation bar 238. The second end 318 of the subordination pole 262 is urged upwardly by a cam 330 upon activation of the gas release mechanism 30. Upward movement of the second end 318 of the subordination pole 262 moves the activation bar 238 downwardly, compresses the return compression spring 254 and aligns the through hole 246 of the metering rod 234 with the chamber 18. This permits the compressed gas 138 to drive the particulate projectiles 38 out of the chamber 18 and through the barrel 22. Downward movement of the second end 318 of the subordination pole 262 causes the activation bar 238 to move upwardly as urged by the return compression spring 254. This allows the particulate projectiles 38 to fill the through hole 246 of the metering rod 234 as it moves in the projectile storage magazine 34 surrounded by the particulate projectiles 38.

(10) In still another variant, as illustrated in FIGS. 3, 4, 4A, 10 and 11, the spring compression mechanism 126 further includes a primary gear rack 334. The gear rack 334 is slidably located in a channel 338 in the supporting stock 50, has gear teeth 342 located upon an upper surface 346 and has mounting fixtures 350 adjacent a forward end 354 for attachment of a slide handle 358. A reduction gear drive 362 is provided. The gear drive 362 is mounted to an outer cover 322 of the cylinder 106. A secondary gear rack 370 is provided. The secondary rack 370 is attached indirectly to the piston 118 and is located slidably in a slot (not shown) in the outer cover 322 above the reduction gear drive 362. The primary gear rack 334 engages the reduction gear drive 362 and the reduction gear drive 362 engages the secondary gear rack 370. Rearward movement of the slide handle 358 moves the primary gear rack rearward 334, rotates the reduction gear drive 362, moves the secondary gear rack 370 rearward and moves the piston 118 rearward, compressing the compression spring 122.

Figure 4:
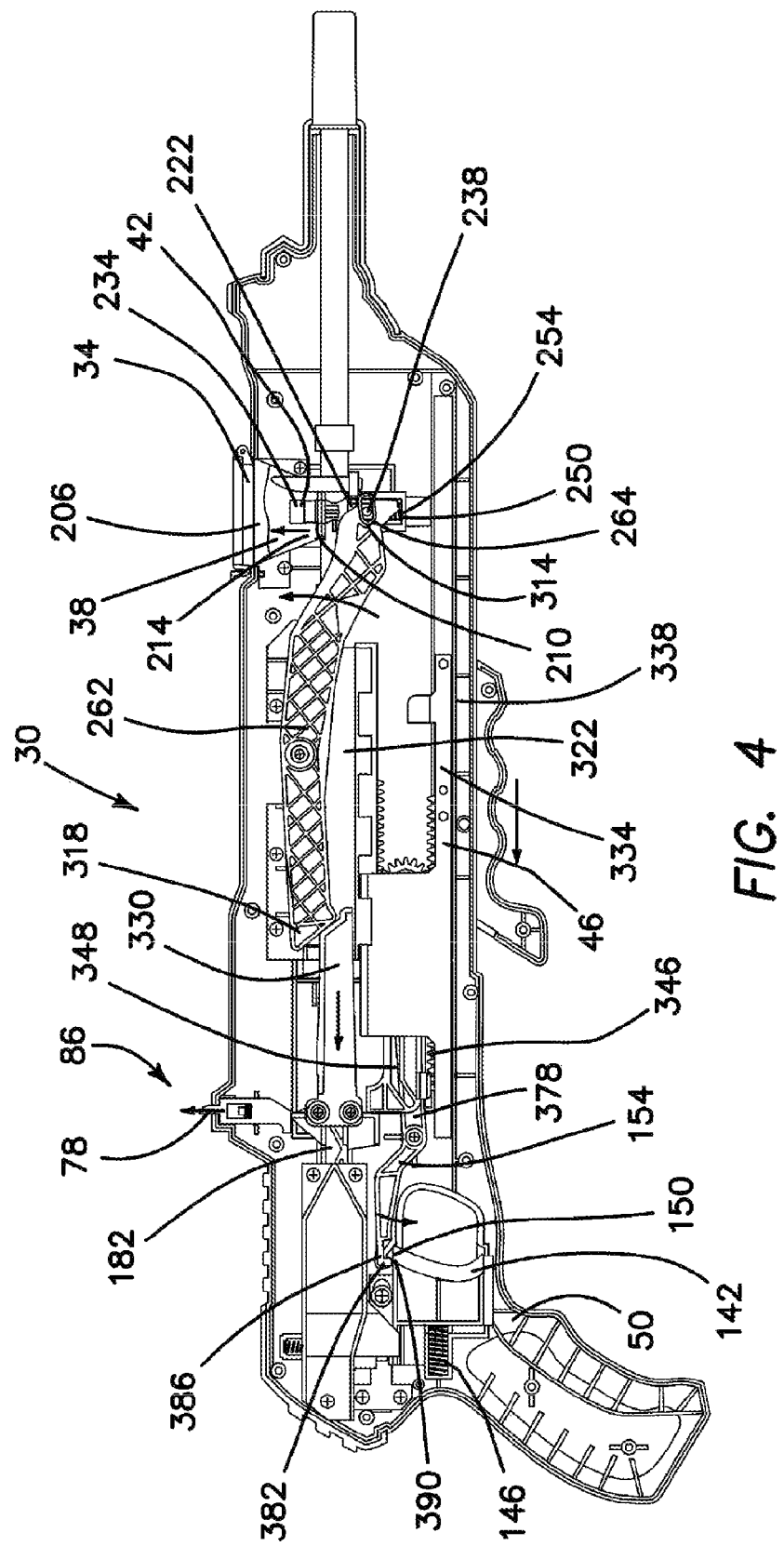
FIG. 4 is a side elevational cross-section of the FIG. 1 embodiment illustrating the projectile loading mechanism in the loading position.
Figure 4A:
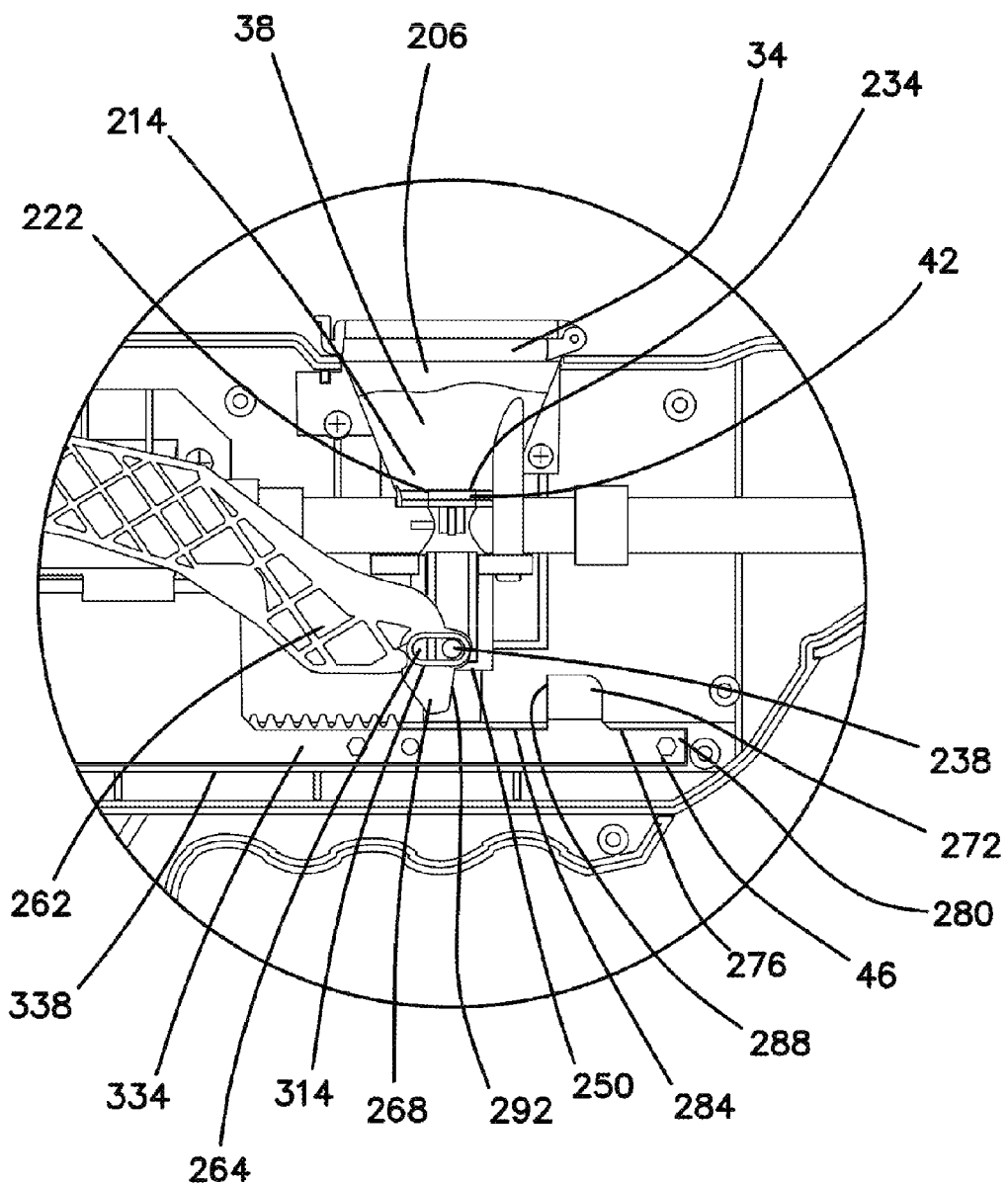
FIG. 4A is an enlarged side elevational cross-section of the FIG. 1 embodiment illustrating the projectile loading mechanism in the firing position with the subordination pole and metering slot in lowered position.
Figure 4B:
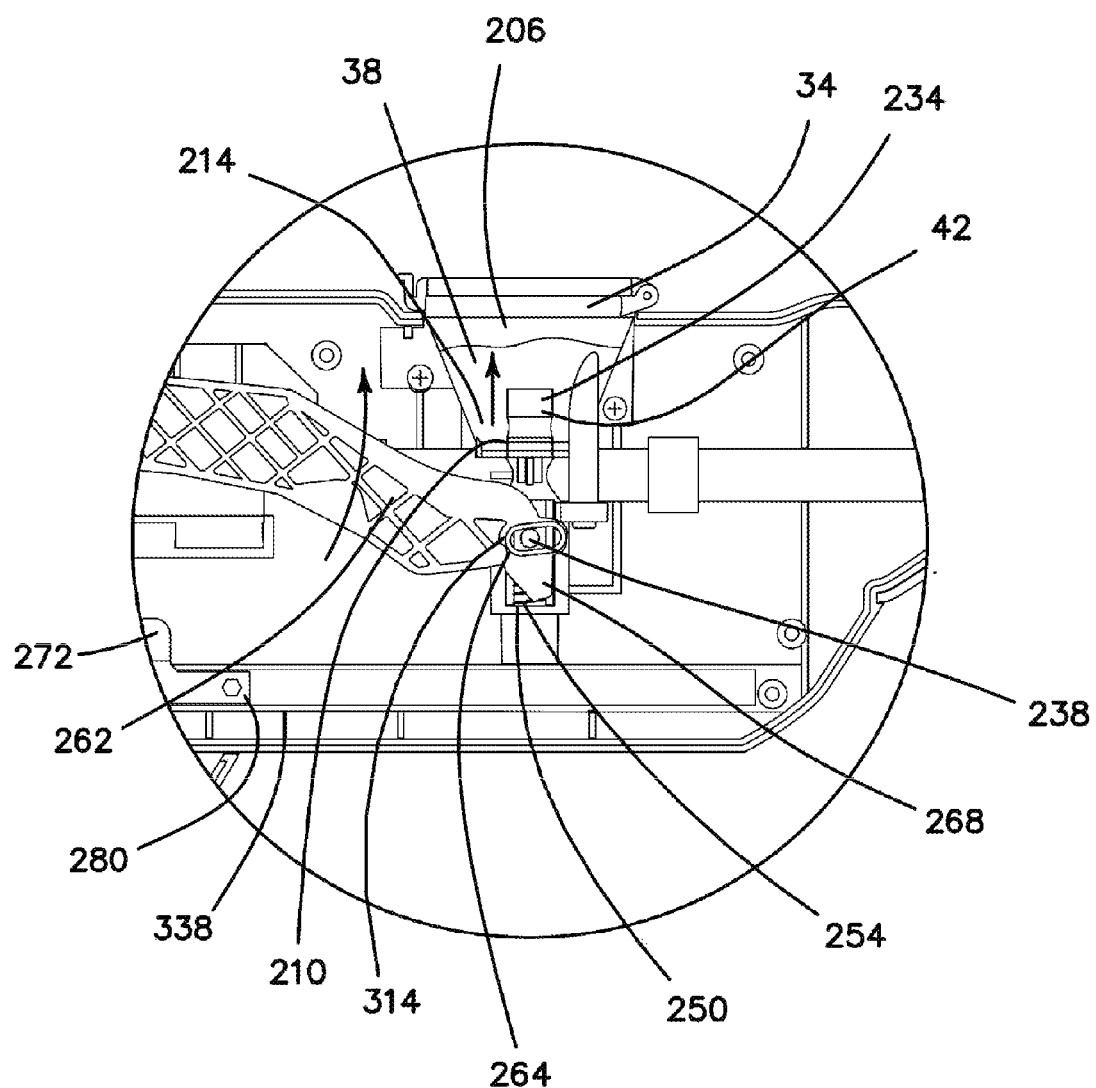
FIG. 4B is an enlarged side elevational cross-section of the FIG. 1 embodiment illustrating the projectile loading mechanism in the loading position with the subordination pole and metering slot in raised position.

(11) In yet another variant, as illustrated in FIGS. 4A and 4B, a downward pointing cam lobe 268 is provided. The cam lobe 268 is located beneath and orthogonal to the metering slot 264. A cam activating tab 272 is provided. The tab 272 is located adjacent to a side edge 276 and front end 280 of an upper surface 284 of the primary gear rack 334. The activating tab 272 has a contoured inner surface 288. The contoured inner surface 288 is sized, shaped and located to engage a front edge 292 of the cam lobe 268 as the primary gear rack 334 is moved rearwardly and forwardly during operation of the cocking mechanism 46. Engagement of the cam lobe 268 causes upward movement of the metering rod 234 followed by downward movement of the metering rod 234 during operation of the cocking mechanism 46. Such movement serving to dislodge any particulate projectiles 38 adhering to the metering rod 234.

(12) In a further variant, engagement of the cam lobe 268 by the cam activating tab 272 during forward movement of the primary gear rack 334 during operation of the cocking mechanism 46 provides an auditory confirmation of completion of the operation.

Figure 3:
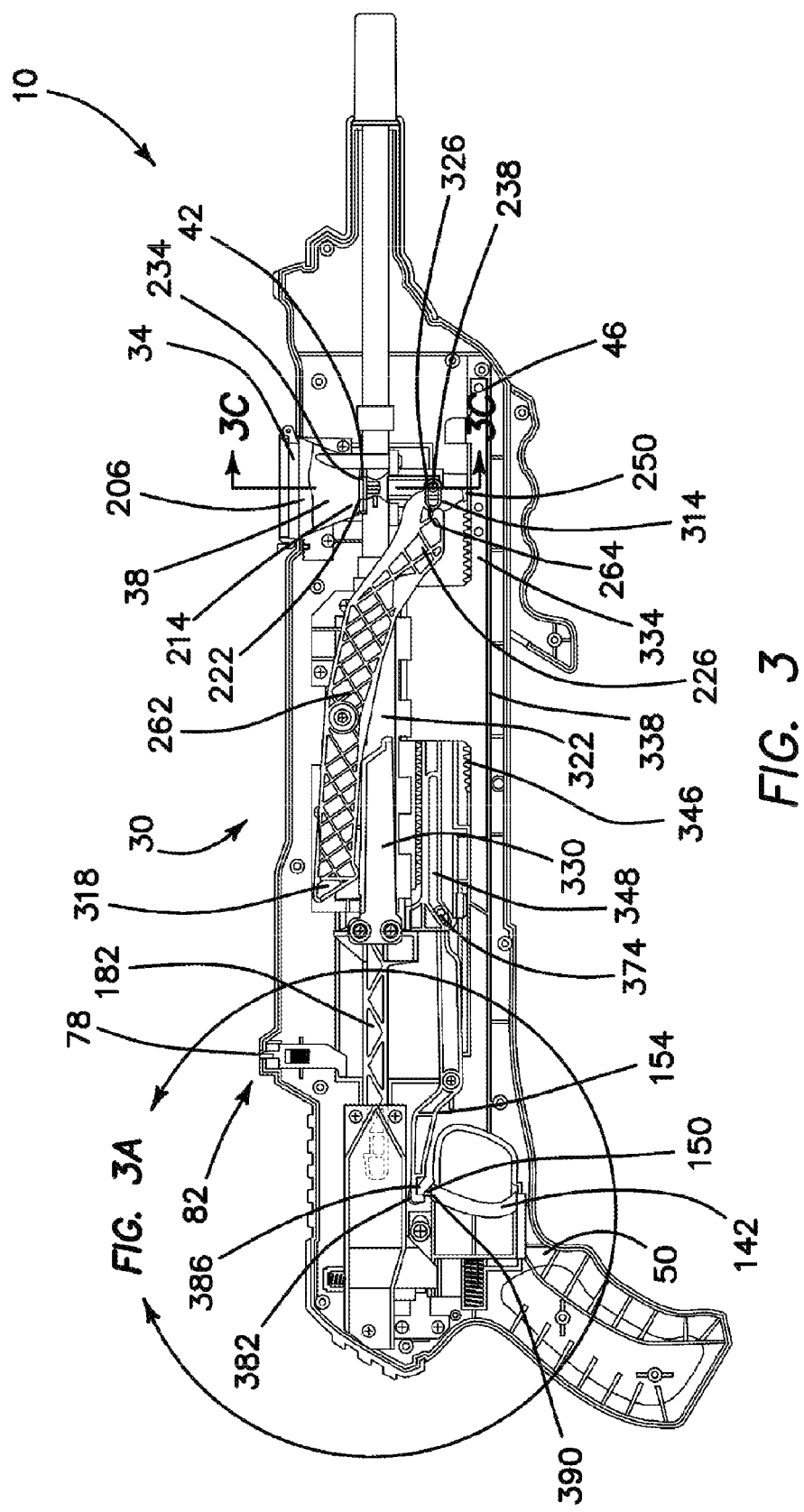
FIG. 3 is a side elevational cross-section of the FIG. 1 embodiment illustrating the projectile loading mechanism in the firing position.
Figure 3A:
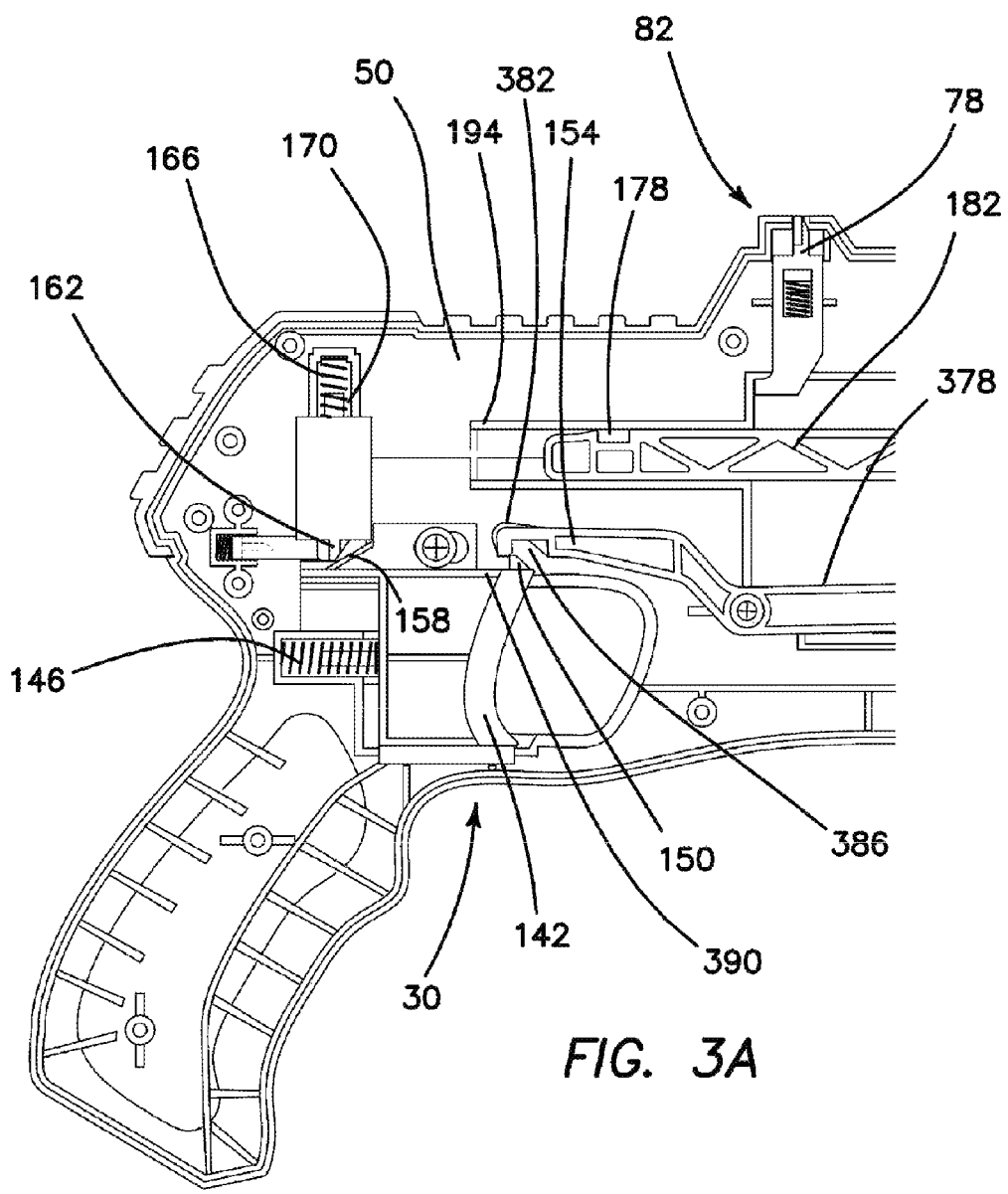
FIG. 3A is a partial side elevational cross-section of the FIG. 1 embodiment illustrating details of the trigger and latching mechanism.

(13) In still a further variant, as illustrated in FIGS. 3, 3A and 4, a control slot 348, moving in concert with main pole 182 maintains a first end 374 of an internal safety pivot 154 in an elevated position 378 during rearward movement of said control slot 348. This causes a second end 382 of the pivot 154, which has a downward facing notch 386, to engage an upper protrusion 150 at an upper end 390 of a trigger 142 of the compressed gas release mechanism 30, thereby preventing activation of the mechanism 30. The control slot 348 causes downward movement of the internal safety pivot 154, upon completion of forward movement of the primary gear rack 334 and said control slot 348. The downward movement permits release of the downward facing notch 386 from the trigger 142 and permits activation of the gas release mechanism 30.

Figure 1:
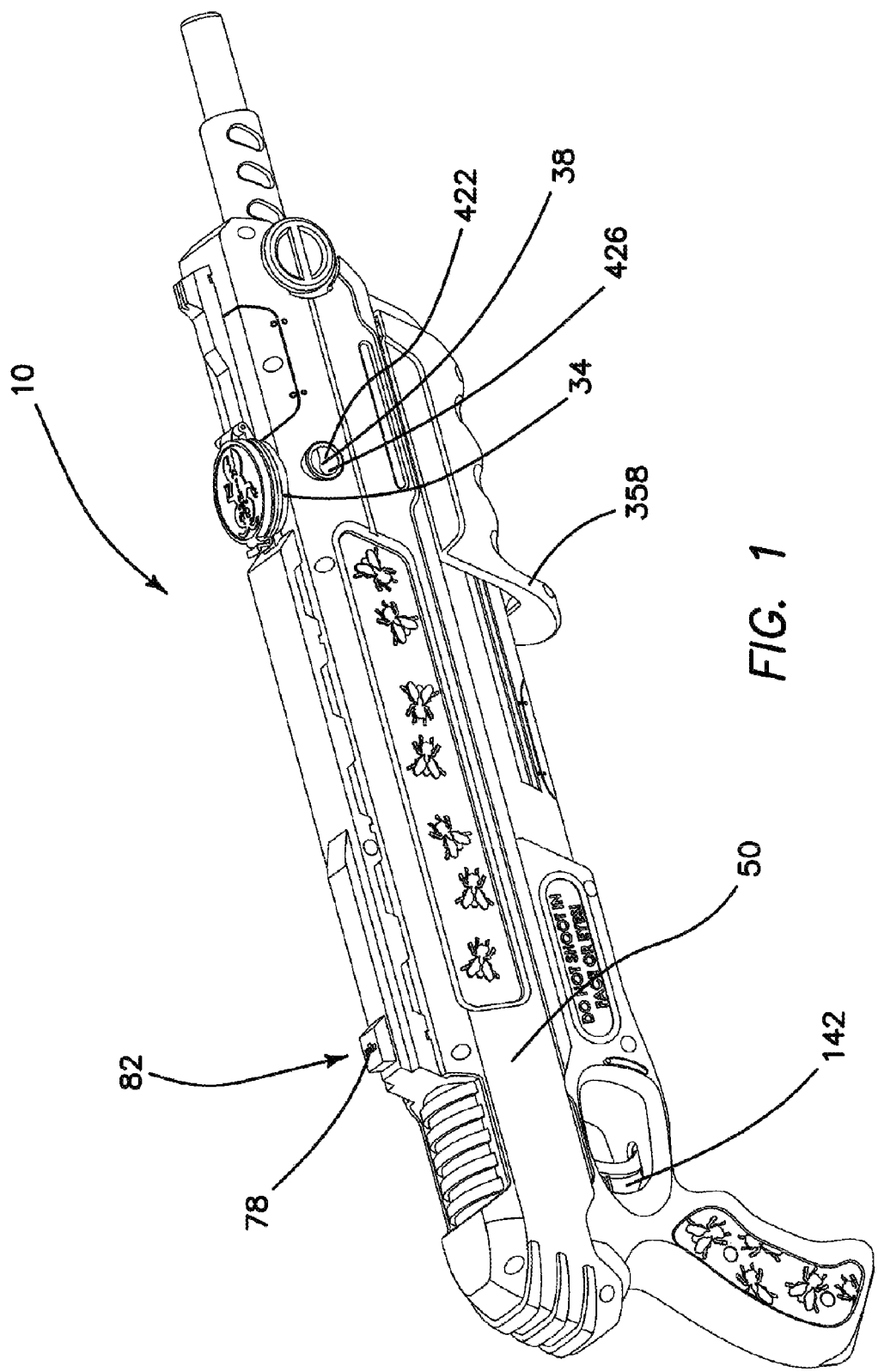
FIG. 1 is a perspective view of the preferred embodiment of the invention including an illustration of the magazine and sight glass.
Figure 2:
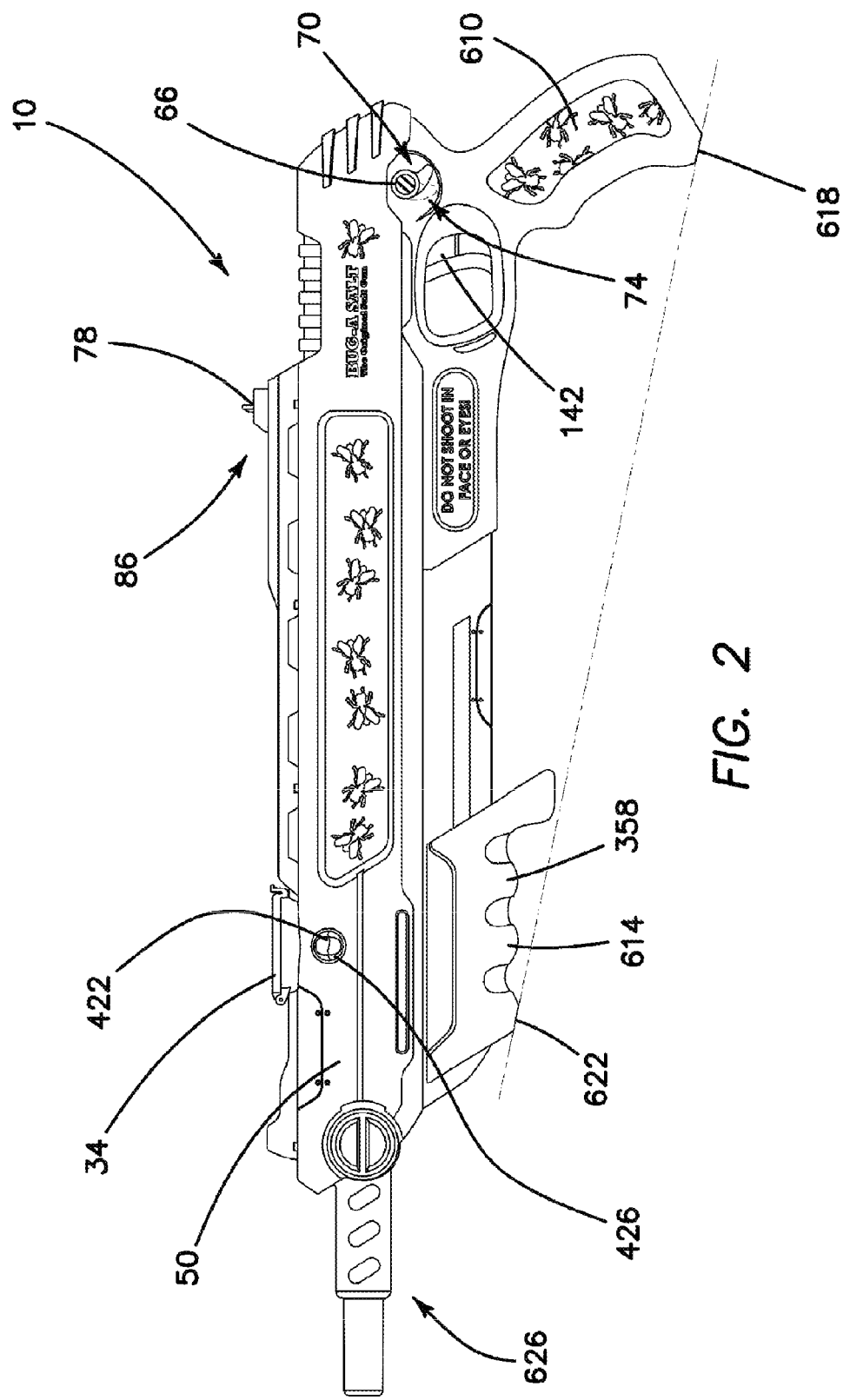
FIG. 2 is a side elevation of the FIG. 1 embodiment illustrating the flattened lower surfaces of the pistol grip and forearm and the external safety.

(14) In yet a further variant, as illustrated in FIGS. 1 and 2, the support stock 50 further includes a sight glass 422. The sight glass 422 is positioned adjacent the magazine 34 and permits a view of a level 426 of the particulate projectiles 38 contained in the magazine 34.

(15) In another variant, as illustrated in FIGS. 12 and 13, the gun 10 uses a prefilled $CO_2$ cartridge 88 as a compressed gas source 14 and the gun 10 further includes a cylindrical cartridge chamber 434. The cartridge chamber 434 is sized and shaped to enclose the $CO_2$ cartridge 88 and has a sealable opening 438 at a first end 442 for introduction of the cartridge 88. A concave seat 446 located at a second end 450 is provided. The seat 446 is sized and shaped to fit sealably about a discharging end 454 of the cartridge 88. A hollow puncturing needle 458 is located within the seat 446 and a one-way valve 462 is fluidly connected to the puncturing needle 458. A sealing cap 466 is provided. The cap 466 is removably attached to the cartridge chamber 434 by mating screw threads 470. Tightening of the cap 466 urges the cartridge 88 against the puncturing needle 458. A pressure vessel 474 is provided. The pressure vessel 474 is fluidly connected to a metering device 478. The metering device 478 permits a predetermined charge of compressed gas 138 to enter the chamber 18 upon activation of the compressed gas release mechanism 30.

(16) In still another variant, as illustrated in FIGS. 3A, 5, 6, 12 and 13, the compressed gas release mechanism 30 further includes a trigger 142. The trigger 142 is urged forward by a trigger return spring 146. The trigger has an upper protrusion 150. The upper protrusion 150 engages an internal safety pivot 154. The safety pivot 154 prevents activation of the compressed gas release mechanism 30 unless the cocking action is completed. The trigger 142 has an elevating ramp 158 located rewardly of the upper protrusion 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 482 in a loading rod 486. The loading rod 486 is urged forward by a loading coil spring 490, has an upwardly angled ramp 494 at a rear end 498, located behind the control notch 482. The ramp 494 guides the rib 174 into the control notch 482.

The loading rod 486 moves rearwardly in a channel (not shown) in the supporting stock 50 during the cocking action. The releasing bracket 162 retains the loading rod 486 in a first, cocked position 502 as the rib 174 engages the control notch 482. The releasing bracket 162 releases the loading rod 486 to a second, fired position 506 as the trigger 142 is moved rearwardly, elevating the releasing bracket 162 and raising the rib 174 from the control notch 482. This allows the loading rod 486 to move forward as urged by the loading coil spring 490. The loading rod 486 activates the projectile loading mechanism 42 and the metering device 478.

(17) In yet another variant of the invention, as illustrated in FIG. 16, the gun 10 uses a pneumatically pumped air reservoir 94 as a compressed gas source 14 and the gun 10 further includes a gas cylinder 514. The cylinder 514 has an inlet valve 518 and an outlet valve 522. A piston 526 is provided. The piston 526 fits sealably within the cylinder 514. A pumping mechanism 530 is provided. The pumping mechanism 530 is mechanically linked to the piston 526 and moves the piston 526 from an extended position 534 to a compressed position 538 within the cylinder 514. The inlet valve 518 is in an open position 542 as the piston 526 moves from the compressed position 538 to the extended position 534 and is in a closed position (not shown) as the piston 526 moves from the extended position 534 to the compressed position 538. The outlet valve 522 is in a closed position 550 as the piston moves 526 from the compressed position 538 to the extended position 534 and is in an open position (not shown) as the piston 526 moves from the extended position 534 to the compressed position 538.

The air reservoir 94 is fluidly connected to the outlet valve 522 and said chamber 18. The projectile loading mechanism 42 permits a predetermined charge of compressed gas 138 to enter the chamber 18 upon activation of the compressed gas release mechanism 30. Repeated movement of the piston 526 by the pumping mechanism 530 from the extended position 534 to the compressed position 538 within the cylinder 514 will increase pressure within the air reservoir 94, permitting the particulate projectiles 38 to be ejected from the chamber 18 with increased force upon release of the pressure by the compressed gas release mechanism 30.

(18) In a further variant, as illustrated in FIGS. 3A, 5, 6, 12 and 13, the compressed gas release mechanism 30 further includes a trigger 142. The trigger 142 is urged forward by a trigger return spring 146. The trigger has an upper protrusion 150. The upper protrusion 150 engages an internal safety pivot 154. The safety pivot 154 prevents activation of the compressed gas release mechanism 30 unless the cocking action is completed. The trigger 142 has an elevating ramp 158 located rewardly of the upper protrusion 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 482 in a loading rod 486. The loading rod 486 is urged forward by a loading coil spring 490, has an upwardly angled ramp 494 at a rear end 498, located behind the control notch 482. The ramp 494 guides the rib 174 into the control notch 482.

The loading rod 486 moves rearwardly in a channel 498 in the supporting stock 50 during the cocking action. The releasing bracket 162 retains the loading rod 486 in a first, cocked position 502 as the rib 174 engages the control notch 482. The releasing bracket 162 releases the loading rod 486 to a second, fired position 506 as the trigger 142 is moved rearwardly, elevating the releasing bracket 162 and raising the rib 174 from the control notch 482. This allows the loading rod 486 to move forward as urged by the loading coil spring 490. The loading rod 486 activates the projectile loading mechanism 42 and the metering device 478.

(19) In still a further variant, as illustrated in FIG. 14, the gun 10 uses a refillable compressed gas cylinder 90 as a compressed gas source 14. The cylinder 90 has a shut off valve 574 and an attachment fitting 578 located adjacent a first end 582. A mating attachment fitting 586 is provided. The mating fitting 586 is mounted to the support stock 50 and is fluidly connected to a metering device 478. The metering device 478 is fluidly connected to the chamber 18 and the metering device 478 permits a predetermined charge of compressed gas 138 to enter the chamber 18 upon activation of the compressed gas release mechanism 30. A charged refillable compressed gas cylinder 90 is attached to the mating attachment fitting 586, the shut off valve 574 is opened and the compressed gas 138 is released by the metering device 478 upon activation of the compressed gas release mechanism 30.

(20) In yet a further variant, as illustrated in FIGS. 3A, 5, 6, 12 and 13, the compressed gas release mechanism 30 further includes a trigger 142. The trigger 142 is urged forward by a trigger return spring 146. The trigger has an upper protrusion 150. The upper protrusion 150 engages an internal safety pivot 154. The safety pivot 154 prevents activation of the compressed gas release mechanism 30 unless the cocking action is completed. The trigger 142 has an elevating ramp 158 located rewardly of the upper protrusion 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 482 in a loading rod 486. The loading rod 486 is urged forward by a loading coil spring 490, has an upwardly angled ramp 494 at a rear end 498, located behind the control notch 482. The ramp 494 guides the rib 174 into the control notch 482.

The loading rod 486 moves rearwardly in a channel 498 in the supporting stock 50 during the cocking action. The releasing bracket 162 retains the loading rod 486 in a first, cocked position 502 as the rib 174 engages the control notch 482. The releasing bracket 162 releases the loading rod 486 to a second, fired position 506 as the trigger 142 is moved rearwardly, elevating the releasing bracket 162 and raising the rib 174 from the control notch 482. This allows the loading rod 486 to move forward as urged by the loading coil spring 490. The loading rod 486 activates the projectile loading mechanism 42 and the metering device 478.

(21) In another variant, as illustrated in FIG. 15, the gun 10 uses an external compressed gas line 102 as a compressed gas source 14. The line 102 is connected to a compressed gas source 592 and has a shut off valve 594 and an attachment fitting 598 located adjacent a first end 602. A mating attachment fitting 606 is provided. The mating fitting 606 is mounted to the support stock 50 and is fluidly connected to a metering device 478. The metering device 478 is fluidly connected to the chamber 18. The metering device 478 permits a predetermined charge of compressed gas 138 to enter the chamber 18 upon activation of the compressed gas release mechanism 30. The external compressed gas line 102 is attached to the mating attachment fitting 606, the shut off valve 594 is opened and the compressed gas 138 is released by the metering device 478 upon activation of the compressed gas release mechanism 30.

(22) In still another variant, as illustrated in FIGS. 3A, 5, 6, 9, 12 and 13, the compressed gas release mechanism 30 further includes a trigger 142. The trigger 142 is urged forward by a trigger return spring 146. The trigger has an upper protrusion 150. The upper protrusion 150 engages an internal safety pivot 154. The safety pivot 154 prevents activation of the compressed gas release mechanism 30 unless the cocking action is completed. The trigger 142 has an elevating ramp 158 located rewardly of the upper protrusion 150. The elevating ramp 158 urges a releasing bracket 162 of the latching mechanism 130 upwardly against a downwardly urging compression spring 166 as the trigger 142 is moved rearwardly. The releasing bracket 162 moves slidably within a vertical channel 170 in the supporting stock 50 and has a downwardly facing rib 174. The rib 174 releasably engages an upwardly facing control notch 482 in a loading rod 486. The loading rod 486 is urged forward by a loading coil spring 490, has an upwardly angled ramp 494 at a rear end 498, located behind the control notch 482. The ramp 494 guides the rib 174 into the control notch 482.

The loading rod 486 moves rearwardly in a channel 498 in the supporting stock 50 during the cocking action. The releasing bracket 162 retains the loading rod 486 in a first, cocked position 502 as the rib 174 engages the control notch 482. The releasing bracket 162 releases the loading rod 486 to a second, fired position 506 as the trigger 142 is moved rearwardly, elevating the releasing bracket 162 and raising the rib 174 from the control notch 482. This allows the loading rod 486 to move forward as urged by the loading coil spring 490. The loading rod 486 activates the projectile loading mechanism 42 and the metering device 478.

(23) In yet another variant, as illustrated in FIG. 2, a pistol grip 610 and a forearm 614 of the support stock 50 have flattened lower surfaces 618, 622. The flattened surfaces 618, 622 permit the improved bug killing gun 10 to be balanced in an upright position 626 for adding the particulate projectiles 38 to the projectile storage magazine 34.

Figure 17:
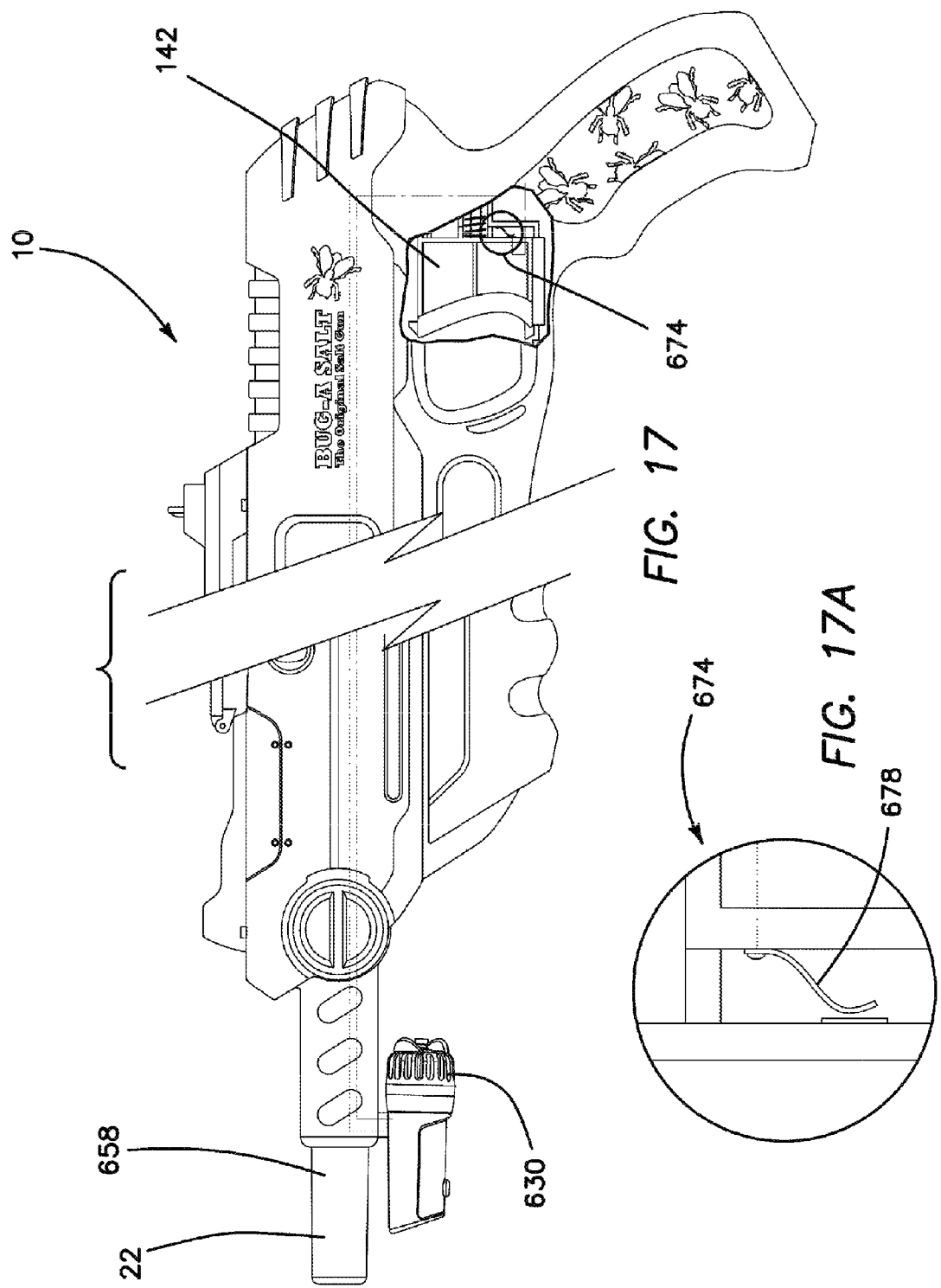
FIG. 17 is a side elevational view of the FIG. 1 embodiment with integral laser sighting device.
Figure 18:
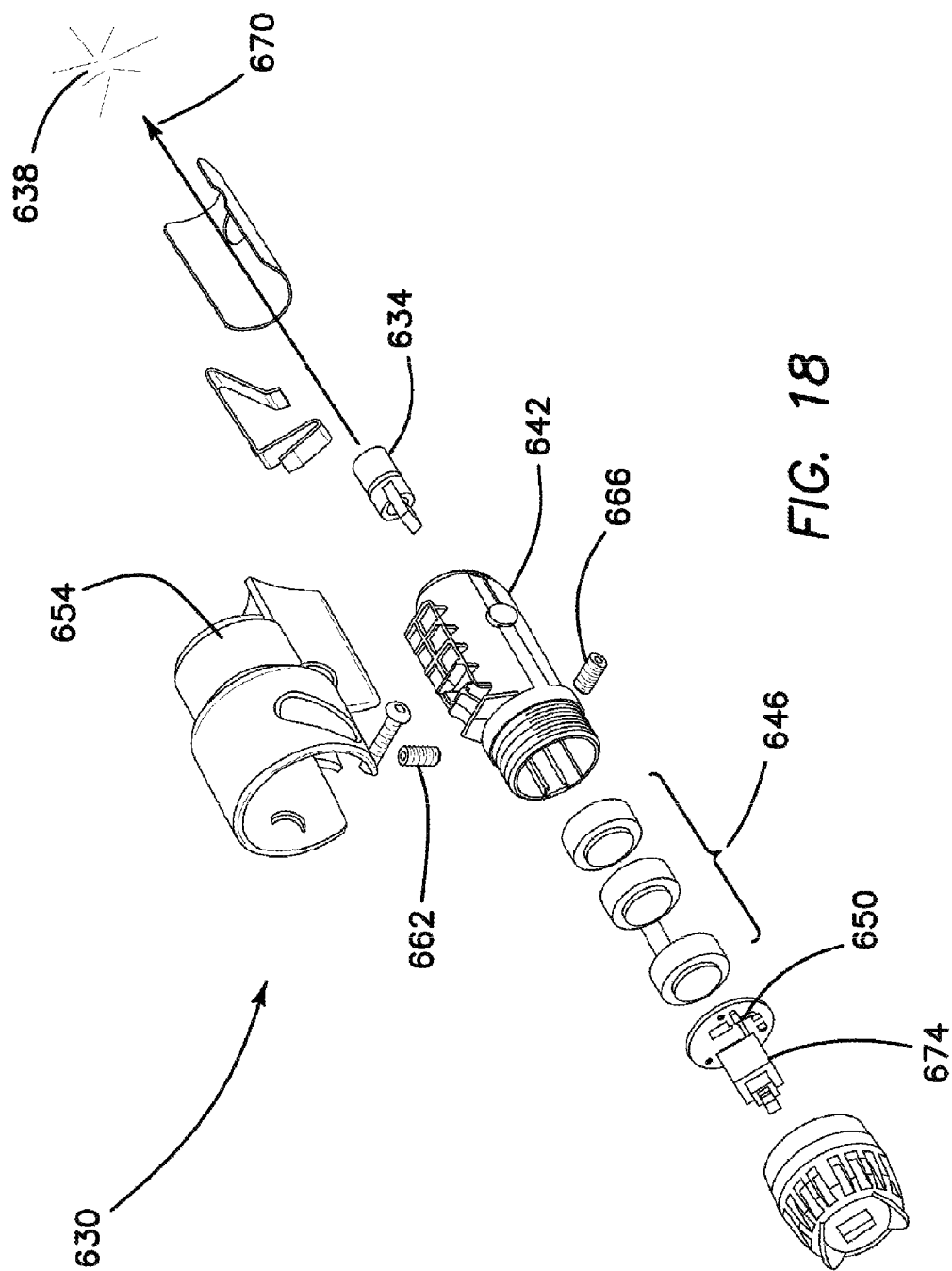
FIG. 18 is an exploded perspective view of a removable version of the laser sighting device including details of the assembly and aiming controls.

(24) In a further variant of the invention, as illustrated in FIGS. 17, 17A and 18, the improved bug killing gun 10 further includes a laser sighting device 630. The laser sighting 630 device includes a battery powered laser 634. The laser 634 is capable of producing a laser aiming spot 638. A housing 642 is provided. The housing 642 is adapted to contain the laser 634, a battery power source 646 and a control circuit 650 for the laser 634. An attachment mechanism 654 is provided. The attachment mechanism 654 is adapted to attach the laser sighting device 630 adjacent a distal end 658 of the barrel 22.

(25) In still a further variant, as illustrated in FIG. 17, the attachment mechanism 654 is integrally formed with the distal end 658 of the barrel 22.

(26) In yet a further variant, as illustrated in FIG. 18, the attachment mechanism 654 is adapted to removably attach the laser sighting device 630 to the distal end 658 of the barrel 22.

(27) In another variant, the laser sighting device 630 includes elevation 662 and windage 666 adjustments for an aiming point 670 of the laser aiming spot 638.

(28) In still another variant, a power switch 674 is provided. The switch 674 controls power to the laser 634.

(29) In yet another variant, the power switch 674 is mounted on the housing 642.

(30) In a final variant of the invention, as illustrated in FIGS. 17 and 17A, the power switch 674 is integral with the trigger 142. Initial rearward movement of the trigger 142 completes a circuit 678 within the power switch 674, thereby providing the laser aiming spot 638 prior to activation of the compressed gas release mechanism 30.

The improved bug killing gun 10 has been described with reference to particular embodiments. Other modifications and enhancements can be made without departing from the spirit and scope of the claims that follow.

The invention claimed is:
1. An improved bug killing gun, comprising:
a compressed gas source;
a chamber, said chamber fluidly connected to said compressed gas source;
a barrel, said barrel disposed at a distal end of said chamber;
said compressed gas source comprising a spring-activated compressed gas chamber comprising:
  a cylinder, said cylinder having a front end and a rear end and being fluidly connected to said chamber at said front end;
  a piston, said piston fitting sealably in said cylinder and being disposed therein;
  a compression spring, said compression spring urging said piston toward said front end;
  a spring compression mechanism, said compression mechanism urging said piston towards said rear end and compressing said compression spring;
  a latching mechanism, said latching mechanism releasably retaining said piston adjacent said rear end and retaining said compression spring in a compressed state; and
wherein when a user operates a cocking mechanism, said spring compression mechanism is operated, said piston is urged toward said rear end of said cylinder, said spring is compressed and said spring and said piston are retained by said latching mechanism until released allowing said piston to move rapidly toward said front end of said cylinder, providing a burst of compressed gas in said cylinder and to said connected chamber;
said spring compression mechanism comprising:
  a primary gear rack, said gear rack being slidably disposed in a channel in a stock, having gear teeth disposed upon an upper surface and having mounting fixtures adjacent a forward end for attachment of a slide handle;
  a reduction gear drive, said gear drive mounted to an outer cover of said cylinder;
  a secondary gear rack, said secondary rack attached indirectly to said piston and being disposed slidably in a slot in said outer cover above said reduction gear drive;
  said primary gear rack engaging said reduction gear drive and said reduction gear drive engaging said secondary gear rack;
  wherein rearward movement of said slide handle moves said primary gear rack rearward, rotates said reduction gear drive, moves said secondary gear rack rearward and moves said piston rearward, compressing said compression spring;
a compressed gas release mechanism, said release mechanism connected to said compressed gas source;
a projectile storage magazine, said magazine storing particulate projectiles and being disposed adjacent said chamber;
said projectile storage magazine comprising a conical container, said container having a circular opening at a lower end;
said lower end fitted sealably to an upper end of a vertical circular opening through said chamber;
said container having a sealing lid removably or hingedly attached at an upper end;
a projectile loading mechanism, said loading mechanism moving said particulate projectiles into said chamber from said magazine;
said projectile loading mechanism comprising a metering rod, said metering rod being sized and shaped to fit sealably through said vertical circular opening through said chamber and having an orthogonal activation bar extending from a lower end thereof and a through hole disposed above said activation bar, said through hole being orthogonal to said bar and said metering rod and sized and disposed to align with said chamber when said bar is positioned against a stopping surface;
said activation bar being urged upwardly by a return compression spring to rest against said lower end of said vertical circular opening in said chamber;
said through hole filling with said particulate projectiles when disposed above said chamber in said conical container during operation of said cocking mechanism;

said activation bar being urged downwardly by a pivotally mounted subordination pole to rest against said stopping surface just after activation of said compressed gas release mechanism, permitting said 36 compressed gas to eject said particulate projectiles from said chamber and through said barrel;

said projectile loading mechanism further comprises:
a mid-chamber pipe, said pipe extending downwardly from a lower end of said magazine;
a lower portion of said pipe providing a stop for one end of a return compression spring;
a trajectory guide, said guide disposed below said magazine, having a hollow bore sized to fit slidably about said pipe and having a vertical slot extending downwardly from said lower end for a first predetermined distance and terminating in a stopping surface;
said trajectory guide being disposed about said pipe and providing a support platform for attachment of said projectile storage magazine;
a metering rod, said rod being cylindrical in shape and being sized to fit slidably within said pipe and having an orthogonal activation bar extending from a lower end thereof and a through hole disposed above said activation bar, said through hole being orthogonal to said bar and said metering rod and sized and disposed to align with said chamber when said bar is positioned against said stopping surface;
said return compression spring urging said metering rod upwardly to rest against said lower end of said vertical circular opening in said chamber; and
said subordination pole having a first end and a second end, being pivotally mounted to said cover for said compressed gas source, said first end comprising a metering slot, said metering slot surrounding said activation bar, said second end being urged upwardly by a cam upon activation of said gas release mechanism;
wherein upward movement of said second end of said subordination pole moves said activation bar downwardly, compressing said return compression spring and aligning said through hole of said metering rod with said projectile chamber, permitting said compressed gas to drive said particulate projectiles out of said chamber and through said barrel;
wherein downward movement of said second end of said subordination pole causes said activation bar to move upwardly as urged by said return compression spring, said particulate projectiles filling said through hole of said metering rod as said metering rod moves in said projectile storage magazine surrounded by said particulate projectiles;
a downward pointing cam lobe on said first end for subordination pole, said cam lobe disposed beneath and orthogonal to said metering slot;
a cam activating tab, said tab disposed on a side and adjacent front end of an upper surface of said primary gear rack, said activating tab having a contoured inner surface;
said contoured inner surface being sized, shaped and disposed to engage a front edge of said cam lobe as said primary gear rack is moved rearwardly and forwardly during operation of said cocking mechanism;
engagement of said cam lobe causing upward movement of said metering rod followed by downward movement of said metering rod during operation of said cocking mechanism, such movement serving to dislodge any particulate projectiles adhering to said metering rod;
said cocking mechanism mechanically connecting said compressed gas source, said compressed gas release mechanism, and said projectile loading mechanism;
a primary automatic safety mechanism, said primary safety mechanism moving to an activated position upon utilization of said cocking mechanism and moving to a deactivated position when manually deactivated by a user, status of said primary safety mechanism being displayed by movement of a primary external safety lever from a first, safe position to a second, firing position;
said stock housing and supporting said compressed gas source, said compressed gas release mechanism, said barrel, said chamber, said projectile storage magazine, said cocking mechanism and said projectile loading mechanism;
wherein, when said gun is cocked by said cocking mechanism, said projectile loading mechanism gathers a predetermined quantity of said particulate projectiles and positions said projectiles in said chamber; and when said compressed gas release mechanism is activated said projectiles are ejected from said chamber into said barrel and expelled from said gun.

2. The improved bug killing gun, as described in claim 1, further comprising a secondary safety indicator, said secondary safety indicator being moved from a hidden position to a visible position by upon utilization of said cocking mechanism and being moved to said hidden position by activation of said compressed gas release mechanism.

3. The improved bug killing gun, as described in claim 1, wherein said compressed gas release mechanism further comprises:
a trigger, said trigger being urged forward by a trigger return spring;
said trigger having an upper protrusion, said upper protrusion engaging an internal safety pivot, said safety pivot preventing release of said latching mechanism unless operation of said cocking mechanism is completed;
said trigger having an elevating ramp disposed rearwardly of said upper protrusion, said elevating ramp urging a releasing bracket of said latching mechanism upwardly against a downwardly urging compression spring as said trigger is moved rearwardly;
said releasing bracket moving slidably within a vertical channel in said supporting stock and having a downwardly facing rib, said rib releasably engaging an upwardly facing control notch in a main pole of said latching mechanism;
said main pole being attached to said piston, having an upwardly angled ramp at a rear end, disposed behind said control notch, said ramp guiding said rib into said control notch, said main pole moving rearwardly in a channel in said supporting stock during operation of said cocking mechanism; and said releasing bracket retaining said main pole in a first, cocked position as said rib engages said control notch and releasing said main pole to a second, fired position as said trigger is moved rearwardly elevating said releasing bracket and raising said rib from said control notch, allowing said main pole and said piston to move forward as urged by said compression spring, pressurizing said cylinder.

4. The improved bug killing gun, as described in claim 1, wherein said lower end of said conical container is fitted sealably to said upper end of said vertical circular opening through said chamber with a sealing washer.

5. The improved bug killing gun, as described in claim 1, wherein engagement of said cam lobe by said cam activating tab during forward movement of said primary gear rack during operation of said cocking mechanism provides an auditory confirmation of completion of said operation.

6. The improved bug killing gun, as described in claim 1, wherein:
   a control slot, moving in concert with a main pole, maintains a first end of an internal safety pivot in an elevated position during rearward movement of said control slot, causing a second end of said pivot, said second end having a downward facing notch, to engage an upper protrusion at an upper end of a trigger of said compressed gas release mechanism, thereby preventing activation of said mechanism; and
   said control slot causing downward movement of said internal safety pivot, upon completion of forward movement of said primary gear rack and said control slot, said downward movement permitting release of said downward facing notch from said trigger and permitting activation of said gas release mechanism.

7. The improved bug killing gun, as described in claim 1, wherein said support stock further comprises a sight glass, said sight glass positioned adjacent said magazine and permitting a view of a level of said particulate projectiles contained therein.

8. The improved bug killing gun, as described in claim 1, wherein a pistol grip and a forearm of said support stock have flattened lower surfaces, said flattened surfaces permitting said bug killing gun to be balanced in an upright position for adding said particulate projectiles to said projectile storage magazine.

9. The improved bug killing gun, as described in claim 3, further comprising a laser sighting device, said laser sighting device comprising:
   a battery powered laser, said laser capable of producing a laser aiming spot;
   a housing, said housing adapted to contain said laser, a battery power source and a control circuit for said laser; and
   an attachment mechanism, said attachment mechanism adapted to attach said laser sighting device adjacent a distal end of said barrel.

10. The improved bug killing gun, as described in claim 9, wherein said attachment mechanism is integrally formed with said distal end of said barrel.

11. The improved bug killing gun, as described in claim 9, wherein said attachment mechanism is adapted to removably attach said laser sighting device to said distal end of said barrel.

12. The improved bug killing gun, as described in claim 9, further comprising elevation and windage adjustments for an aiming point of said laser aiming spot.

13. The improved bug killing gun, as described in claim 9, further comprising a power switch, said switch controlling power to said laser.

14. The improved bug killing gun, as described in claim 9, wherein said power switch is mounted on said housing.

15. The improved bug killing gun, as described in claim 9, wherein said power switch is integral with said trigger, wherein initial rearward movement of said trigger completes a circuit within said power switch, thereby providing said laser aiming spot prior to activation of said compressed gas release mechanism.

* * * * *